(12) United States Patent
Cursley

(10) Patent No.: US 12,117,714 B2
(45) Date of Patent: Oct. 15, 2024

(54) CAMERA CARRYING SYSTEM WITH LOCKABLE STRAP AND TRIPOD ADAPTER

(71) Applicant: Jinx Innovations, LLC, Boulder, CO (US)

(72) Inventor: Jim Cursley, Boulder, CO (US)

(73) Assignee: Jinx Innovations, LLC, Boulder, CO (US)

( * ) Notice: Subject to any disclaimer, the term of this patent is extended or adjusted under 35 U.S.C. 154(b) by 26 days.

(21) Appl. No.: 17/056,093

(22) PCT Filed: Jul. 2, 2020

(86) PCT No.: PCT/US2020/040764
§ 371 (c)(1),
(2) Date: Nov. 17, 2020

(87) PCT Pub. No.: WO2021/003437
PCT Pub. Date: Jan. 7, 2021

(65) Prior Publication Data
US 2022/0187689 A1    Jun. 16, 2022

Related U.S. Application Data

(60) Provisional application No. 62/869,733, filed on Jul. 2, 2019.

(51) Int. Cl.
| | |
|---|---|
| *G03B 17/56* | (2021.01) |
| *A45F 5/00* | (2006.01) |
| *H04N 23/51* | (2023.01) |

(52) U.S. Cl.
CPC .............. *G03B 17/561* (2013.01); *A45F 5/00* (2013.01); *G03B 17/563* (2013.01); *H04N 23/51* (2023.01);
(Continued)

(58) Field of Classification Search
None
See application file for complete search history.

(56) References Cited

U.S. PATENT DOCUMENTS

| | | | |
|---|---|---|---|
| 3,870,209 A | 3/1975 | Mazur | |
| 3,922,694 A | * 11/1975 | Davis | ..................... A45C 11/38 |
| | | | 224/908 |

(Continued)

FOREIGN PATENT DOCUMENTS

| | | |
|---|---|---|
| CN | 202972432 U | 6/2013 |
| FR | 2239695 A1 | 2/1975 |

(Continued)

OTHER PUBLICATIONS

International Search Report and Written Opinion dated Dec. 9, 2020 in International Application No. PCT/US2020/040764; 98 pages.

(Continued)

*Primary Examiner* — Rodney E Fuller
(74) *Attorney, Agent, or Firm* — Berg Hill Greenleaf Ruscitti LLP

(57) ABSTRACT

A camera carrying system of the invention comprises a base attachment configured to be affixed to a bottom face of a camera, the base attachment including spatially-separated first and second bottom eyelets. A shoulder strap having first and second strap ends is connected to the first and second bottom eyelets and creates first and second tether points. The tether points define a rotation axis lying substantially parallel to the bottom face of the camera, substantially parallel to a rear face of the camera, and beneath a center-of-mass of the camera. A tripod adapter may be integrally formed in the base attachment so the camera can be readily mountable to a tripod once disconnected from the base attachment. A (Continued)

method is provided for stabilizing the carrying of a camera by a shoulder strap. The method comprises use of the camera carrying system.

10 Claims, 19 Drawing Sheets

(52) U.S. Cl.
CPC . *A45F 2005/006* (2013.01); *A45F 2200/0533* (2013.01)

(56) References Cited

U.S. PATENT DOCUMENTS

| | | | | |
|---|---|---|---|---|
| 4,272,177 | A * | 6/1981 | Ottenheimer | G03B 17/561 396/425 |
| 4,313,664 | A * | 2/1982 | Finnemore | G03B 17/566 396/420 |
| 4,473,177 | A * | 9/1984 | Parandes | G03B 17/566 396/419 |
| 4,887,318 | A * | 12/1989 | Weinreb | A45F 3/12 224/264 |
| 9,329,459 | B2 | 5/2016 | Overall | |
| 2008/0203127 | A1* | 8/2008 | Castillo-Garrison | A45F 5/02 224/257 |
| 2012/0043360 | A1 | 2/2012 | Kope et al. | |
| 2012/0061439 | A1* | 3/2012 | Wallis | A45F 5/00 224/600 |
| 2013/0101278 | A1* | 4/2013 | Xu | G03B 17/566 396/423 |
| 2014/0093230 | A1 | 4/2014 | Hale et al. | |
| 2015/0261075 | A1 | 9/2015 | Overall | |
| 2015/0323855 | A1 | 11/2015 | Overall | |
| 2017/0108161 | A1 | 4/2017 | Zhao | |
| 2017/0363852 | A1 | 12/2017 | Overall | |
| 2019/0271903 | A1 | 9/2019 | Wilson | |
| 2019/0368653 | A1 | 12/2019 | Olinger | |
| 2020/0076936 | A1 | 3/2020 | Wilson et al. | |

FOREIGN PATENT DOCUMENTS

| | | |
|---|---|---|
| JP | 857-046192 U | 3/1982 |
| JP | 2013154147 A | 8/2013 |
| TJ | 2009/020401 A1 | 2/2009 |
| WO | 2015011697 A1 | 1/2015 |
| WO | 2018127546 A1 | 7/2018 |

OTHER PUBLICATIONS

International Preliminary Report on Patentability dated Dec. 28, 2021 in International Application No. PCT/US2020/040764; 8 pages.
Supplemental European Search Report and Search Opinion in counterpart EP Application No. 20835439, 8 pages.
Australian First Examination Report in counterpart AU Application No. 2020299537, 4 pages.
Japanese Notification Of Reason For Rejection in counterpart JP Application No. 2022-500560, 6 pages.
Canadian Examination Search Report in counterpart CA Application No. 3,145,834, mailed on Feb. 15, 2023, 5 pages.
Canadian Examination Search Report in counterpart CA Application No. 3,145,834, mailed on Feb. 21, 2024, 4 pages.
Australian 3rd Examination Search Report in counterpart AU Application No. 2020299537, mailed on Feb. 22, 2024, 5 pages.
European Office Action in counterpart EP Application No. 20835439. 9, mailed on Mar. 20, 2024, 6 pages.

* cited by examiner

CAMERA CARRYING SYSTEM WITH LOCKABLE STRAP AND TRIPOD ADAPTER

CROSS REFERENCE TO RELATED APPLICATION

This application is a national stage application under 35 U.S.C. 371 of PCT Application No. PCT/US2020/040764 having an international filing date of Jul. 2, 2020, which designated the United States, which PCT application claimed the benefit of U.S. Application Ser. No. 62/869,733, filed Jul. 2, 2019, both of which are incorporated by reference in their entirety. #

FIELD OF THE INVENTION

The invention relates to accessories for cameras, and more particularly, to a camera carrying system for convenient and stabilized carrying of a camera, as well as an embodiment of the invention that includes an integral tripod adapter.

BACKGROUND OF THE INVENTION

Many photographers carry a camera using a camera strap that connects to eyelets, or lugs, that are directly affixed to the camera body. When the strap is placed around the photographer's neck, shoulder, or wrist, the strap prevents the photographer from accidentally dropping the camera. Thus, the camera strap helps protect the camera from damage.

Most cameras include a pair of eyelets that are directly affixed to the top of the camera body. This includes single-lens reflex (SLR) cameras, digital single-lens reflex (DSLR) cameras, mirrorless interchangeable lens cameras, compact digital cameras, and bridge cameras. The eyelets may be located on a top face of the camera body, a top of a front face of the camera body, a top of a rear face of the camera body, or a top of each of two side faces of the camera body. In any case, the eyelets are located on opposite sides (i.e., left and right) of the camera body such that a line connecting the eyelets forms an axis about which the camera body can rotate. More specifically, when a shoulder strap or neck strap is connected to the pair of eyelets to create a corresponding pair of tether points, the weight of the camera, and the location of the camera's center-of-mass (COM) relative to the axis, can generate a torque that rotates the camera body about the axis. When the photographer is standing upright, the camera will come to rest oriented with the front face facing away from the photographer. Thus, when an interchangeable lens is connected to the camera body, it will point outward from the photographer, where it can collide with neighboring people and objects. Such collisions can damage the lens, and the risk of damage is pronounced for long lenses, such as telephoto lenses, that protrude away from the photographer a longer distance than shorter lenses. The generated torque creates ceaseless bouncing action of the camera against the body of the photographer that forces the bottom back edge of the camera to come in contact with the photographer in a bothersome and uncomfortable way.

Described herein is a stabilizing camera carrying system that advantageously reduces risk of damage to the camera by forming a pair of bottom eyelets at or near a bottom of the camera body. When a shoulder strap or neck strap is attached to the bottom eyelets, and the strap/camera is worn by a photographer standing upright, the camera body will come to rest with the front face facing downward (i.e., toward the ground). Thus, an interchangeable lens connected to the camera body points downward, not outward, from the photographer, minimizing its exposure to damage. In some embodiments, the stabilizing camera carrying system forms the bottom eyelets with a base attachment that can be secured to the camera body with a screw that inserts into a tripod socket of the bottom face. In other embodiments, the bottom eyelets are formed directly on the camera body, i.e., directly on a bottom face, a bottom portion of the front face, a bottom portion of the rear face, or a bottom portion of each of the two side faces.

With the front face of the camera body facing downward, the stabilizing camera carrying system described herein also orients the camera body such that an LCD or LED screen on the back of the camera body faces upward. This orientation advantageously protects the screen by minimizing physical contact with the photographer. For example, the photographer may be wearing clothes with hard and/or abrasive surfaces than can scratch or crack the screen, such as denim, belt buckles, belts, or rivets on jeans. When using the stabilizing camera carrying system, the photographer no longer needs to worry about these clothing elements damaging the screen.

U.S. Pat. Nos. 8,047,729 and 8,979,397 describe camera carry systems in which a shoulder strap is connected to a camera at a single tether point located on the bottom face. The use of a single tether point allows the camera to twist. Thus, the photographer may find the camera in a non-ideal orientation when he or she needs to quickly raise the camera and take a photo. As a result, rotatable couplers may be used to prevent the camera strap from binding and/or tangling.

With the stabilizing camera carrying system described herein, the bottom eyelets are spatially separated, advantageously preventing the camera strap from twisting without the need for rotatable couplers or other moveable parts. A line joining the bottom eyelets creates a rotation axis that is parallel to the bottom face and is therefore oriented so that the camera can freely rotate up and down. By inhibiting left/right rotation of the camera body (i.e., rotations about a vertical axis), the bottom face of the camera always comes to rest against the photographer in the same orientation (i.e., with the lens pointing downward and the bottom face of the camera resting against the photographer), allowing the photographer to more quickly raise the camera and take a photo without the need to re-orient the camera and/or untwist the strap.

Many shoulder straps used for carrying cameras present a trade-off between comfort and response speed. More specifically, these shoulder straps are padded to increase comfort when in contact with the photographer's shoulder. The padding is typically a compressible material that readily conforms to the photographer's shoulder to increase the area of contact between the shoulder and the strap. As the thickness of the padding increases, the padding can better conform to surface variations of the shoulder, further increasing the area of contact. To some extent, the area of contact can also be increased by widening the strap (and padding). A larger area of contact decreases pressure on the shoulder, which increases comfort and helps to reduce muscle aches and fatigue.

However, as the area of contact between the shoulder and the strap increases, so does the friction between the shoulder and the bottom surface of the strap. For the photographer to lift the camera up to his/her eye, the photographer must apply to the camera a force that is large enough to overcome the friction. In general, the larger the friction, the slower the camera can be accelerated upward. Thus, thick padding and/or wide straps, while more comfortable than thin and/or narrow straps, may prevent the photographer from responding rapidly enough to capture a desired shot.

To overcome this trade-off, the shoulder strap can be threaded through a shoulder pad that rests against the photographer's shoulder. The width and/or thickness of the shoulder pad can be selected to create a large area of contact with the shoulder, thus providing comfort. At the same time, the shoulder pad can be constructed of materials that allow the shoulder strap to slide easily against the shoulder pad, thereby facilitating rapid movement of the camera. In other words, the friction between the shoulder and the bottom surface of the shoulder pad can be engineered separately from the friction between the shoulder strap and the top surface of the shoulder pad, allowing both comfort and rapid speed to be attained simultaneously.

In some embodiments, the stabilizing camera carrying system features a lockable shoulder strap that, when unlocked, allows the shoulder strap to easily slide relative to a shoulder pad that remains fixed against the photographer's shoulder. As described above, low friction between the shoulder strap and the shoulder pad facilitates rapid upward acceleration of the camera that improves response speed. When locked, the shoulder strap does not slide relative to the shoulder pad, advantageously helping to prevent the camera from twisting, shifting, and/or dangling when the photographer moves and is not using the camera. For example, when the photographer leans over (e.g., kneeling or riding a bike), the locked shoulder strap prevents the camera from shifting forward and hanging down from the photographer's torso, where it is more exposed to damage and where it may rest in an uncomfortable position. In other examples, the locked shoulder strap prevents the camera from shifting while the photographer is running, climbing, or hiking. A locking mechanism (e.g., a cam buckle or a cam lever) can be quickly engaged to lock the shoulder strap in place or disengaged to permit the shoulder strap to slide freely relative to the shoulder pad.

Considering the foregoing features of the invention, in one aspect, the invention can be considered a camera carrying system comprising: a base attachment configured to be affixed to a bottom face of a camera, the base attachment including spatially-separated first and second bottom eyelets; and wherein a shoulder strap having first and second strap ends, when connected to the first and second bottom eyelets, creates first and second tether points that define a rotation axis lying substantially parallel to the bottom face of the camera, substantially parallel to a rear face of the camera, and beneath a center-of-mass of the camera.

In connection with this first aspect of the invention, it may incorporate optional features. These optional features may include: (1) a shoulder pad having one or more loops through which the shoulder strap is threaded; and a locking mechanism that, when engaged, increases friction between the shoulder strap and the shoulder pad to prevent sliding of the shoulder strap along the shoulder pad, and when disengaged, decreases the friction between the shoulder strap and the shoulder pad to facilitate sliding of the shoulder strap along the shoulder pad in response to movement of the camera; (2) an outward-facing side of the shoulder pad is constructed from a first material; the shoulder strap is constructed from a second material; and wherein the first and second materials are chosen based on a selected coefficient of dynamic friction between the first and second materials; (3) the base attachment includes a through-hole configured such that a screw passing through the through-hole is threaded into a tripod socket of the camera to fixedly secure the base attachment to the camera; (4) the first and second bottom eyelets are affixed to a rear surface of the base attachment. (5) the first and second bottom eyelets are affixed to first and second side surfaces of the base attachment; and (6) wherein the first and second bottom eyelets are affixed to a bottom surface of the base attachment.

According to another aspect of the invention, it may be considered a shoulder strap system for carrying an object comprising: a shoulder strap having first and second strap ends configured to connect to the object; a shoulder pad having one or more loops through which the shoulder strap is threaded; and a locking mechanism that, when engaged, increases friction between the shoulder strap and the shoulder pad to prevent sliding of the shoulder strap along the shoulder pad, and when disengaged, decreases the friction between the shoulder strap and the shoulder pad to facilitate sliding of the shoulder strap along the shoulder pad in response to movement of the object.

Optional features of the shoulder strap system may further include: (1) each first and second strap ends include a cord loop connector and a length of cord for connection to an attached object; (2) said cord loop connector having a folded section forming an opening to receive a corresponding length of said cord therethrough, and said cord loop connector having a snap connector for selectively fastening and unfastening an end of said cord loop connector; and (3) each said first and second strap ends further including a grommet to receive a corresponding length of said cord therethrough.

According to yet another aspect of the invention, it may be considered a camera carrying system comprising: a base attachment configured to be affixed to a bottom face of a camera, the base attachment including a base plate and a base plate insert connected to the base plate; spatially-separated first and second bottom eyelets secured to the base attachment; a screw chamber formed on an exposed side of said base plate insert and configured to receive a camera locking screw therein; and wherein a shoulder strap having first and second strap ends, when connected to the first and second bottom eyelets, creates first and second tether points that define a rotation axis lying substantially parallel to the bottom face of the camera, substantially parallel to a rear face of the camera, and beneath a center-of-mass of the camera.

According to this third aspect of the invention, optional features may further include: a tripod adapter selectively engaged with said base attachment; and wherein said tripod adapter includes at least one slot that receives a corresponding protrusion extending from a central slot formed in said base plate.

According to yet another aspect of the invention, it may be considered a base attachment especially adapted for use in a camera carrying system comprising: a base attachment including a base plate and a base plate insert connected to the base plate; spatially-separated first and second bottom eyelets secured to the base attachment; a screw chamber formed on an exposed side of said base plate insert and configured to receive a camera locking screw therein; and wherein the base attachment is configured to be secured to a bottom face of a camera by said camera locking screw being engaged with a tripod socket formed into a bottom face of the camera.

According to this fourth aspect of the invention, an optional feature may include wherein said camera locking screw is configured such that it does not extend outwardly beyond an adjacent surface of said base plate insert.

According to yet another aspect of the invention, it may be considered a base attachment especially adapted for use in a camera carrying system comprising: a base attachment including a base plate and a base plate insert connected to the base plate; a central slot formed in said base plate; spatially-separated first and second bottom eyelets secured to the base attachment; a screw chamber formed on an exposed side of said base plate insert and configured to receive a camera locking screw therein; a tripod adapter selectively engaged with said central slot of said base plate; and wherein the base attachment is secured to a bottom face of a camera by said camera locking screw being engaged with a tripod socket formed into a bottom face of the camera.

According to this fifth aspect of the invention optional features may further include: (1) said tripod adapter includes at least one slot that receives a corresponding protrusion extending from said central slot of said base plate; and (2) an actuator pin mounted in said base attachment and being selectively operable to lock and unlock engagement of said tripod adapter with said base attachment.

According to yet another aspect of the invention, it may be considered a method of stabilizing the carrying of a camera by a shoulder strap, said method comprising: providing a camera carrying system, comprising: a base attachment configured to be affixed to a bottom face of the camera, the base attachment including spatially-separated first and second bottom eyelets; providing a shoulder strap; connecting first and second strap ends of said shoulder strap to the first and second bottom eyelets, respectively; and wherein the connecting step creates first and second tether points that define a rotation axis lying substantially parallel to the bottom face of the camera, substantially parallel to a rear face of the camera, and beneath a center-of-mass of the camera.

According to this sixth aspect of the invention optional features may further include: (1) providing a shoulder pad having one or more loops through which the shoulder strap is threaded; providing a locking mechanism; engaging the locking mechanism against the shoulder strap that increases friction between the shoulder strap and the shoulder pad to prevent sliding of the shoulder strap along the shoulder pad, and selectively disengaging the locking mechanism to decrease the friction between the shoulder strap and the shoulder pad to facilitate sliding of the shoulder strap along the shoulder pad in response to movement of the camera; (2) providing a tripod adapter secured to the camera and selectively engaged with said base attachment; and selectively engaging and disengaging said tripod with said base attachment wherein when disengaged, said tripod adapter and camera are separated from said base attachment, and when engaged, said tripod adapter and camera are connected to said base attachment; and (3) wherein said tripod adapter includes at least one slot that receives a corresponding protrusion extending from a central slot formed in said base attachment.

Other features and advantages of the invention will become apparent from a review of the following detailed description taken in conjunction with the figures described herein.

DETAILED DESCRIPTION

Figure 1:
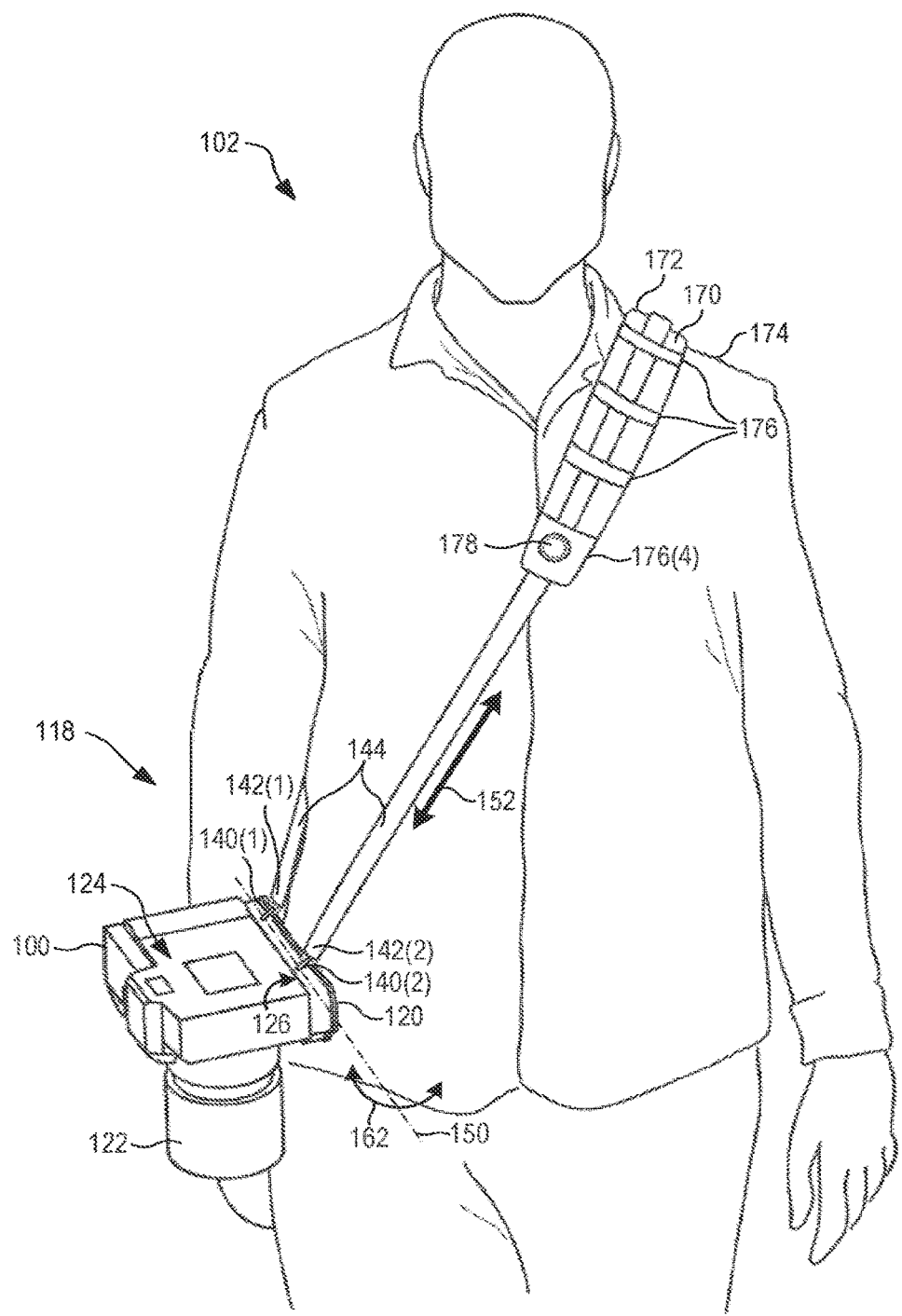
FIG. 1 is a front view of a photographer using a stabilizing camera carrying system to position a camera against a right hip of the photographer, in an embodiment.

FIG. 1 is a front view of a photographer 102 using a stabilizing camera carrying system 118 to position a camera 100 against a right hip of photographer 102. Camera carrying system 118 includes a base attachment 120 that affixes to a bottom face 126 of camera 100, and that receives first and second strap ends 142(1), 142(2) of a shoulder strap 144 to form first and second tether points 140(1), 140(2), respectively. Tether points 140(1), 140(2) form a rotation axis 150 about which camera 100 can rotate, as indicated by arrow 162. When camera 100 comes to rest at the right hip of photographer 102, camera 100 is oriented such that bottom face 126 of camera 100 faces the hip of photographer 102, a rear face 124 of camera 100 points upward, and a lens 122 attached to camera 100 points downward.

In FIG. 1, photographer 102 wears shoulder strap 144 over a left shoulder 174. Shoulder strap 144 passes through a shoulder pad 172 that distributes a weight of camera 100 over shoulder 174. Shoulder pad 172 includes one or more loops 176 through which shoulder strap 144 is threaded. Loops 176 guide shoulder strap 144 across shoulder pad 172 so that shoulder strap 144 remains in contact with an outward-facing side 170 of shoulder pad 172, thereby ensuring that shoulder strap 144 transfers the weight of camera 100 to shoulder pad 172. In FIG. 1, loops 176 are spatially separated so that shoulder strap 144 is uncovered between neighboring loops 176, similar to belt loops on a pair of pants. However, loops 176 may alternatively form a single sheath that covers shoulder strap 144 where it runs over shoulder pad 172. Alternatively, shoulder pad 172 may form a different type of guide, groove, or shape to position shoulder strap 144 across shoulder pad 172 as shown in FIG. 1.

To take a photograph with camera 100, photographer 102 may hold camera 100 (e.g., with his or her right hand, or with both hands), and raise camera 100 up to his or her face (e.g., to look through a viewfinder of camera 100). Shoulder strap 144 is a slidable strap, wherein shoulder strap 144 moves along a direction 152 as photographer 102 moves camera 100 upward and downward. More specifically, shoulder strap 144 slides through loops 176 while shoulder pad 172 remains fixed against shoulder 174.

Shoulder pad 172 includes a locking mechanism 178 that, when engaged, stops shoulder strap 144 from sliding relative to shoulder pad 172. Locking mechanism 178 is shown in FIG. 1 as a button that photographer 102 can push or slide to increase friction between shoulder strap 144 and outward-facing side 170 of shoulder pad 172. Other types of locking mechanism 178 may be used without departing from the scope hereof When locking mechanism 178 is disengaged, shoulder strap 144 can slide freely along direction 152. To facilitate sliding, shoulder strap 144 and outward-facing side 170 of shoulder pad 172 may be constructed from materials with a low coefficient of dynamic friction. For example, shoulder strap 144 may be constructed from strapping or webbing made from nylon, polypropylene, polyester, cotton, or another type of woven fabric. Outward-facing side 170 of shoulder pad 172 may be constructed with similar materials. An inward-facing side of shoulder pad 172 that contacts shoulder 174 may be constructed from a material that has a high coefficient of static friction with shoulder 174 (i.e., a clothing material covering shoulder 174). Other materials that may be used to construct shoulder strap 144, outward-facing side 170, and/or the inward-facing side of shoulder pad 172 include synthetic rubbers (e.g., neoprene), natural rubbers, wool, silk, leather, bamboo textile, linen, and elastane. In some embodiments, shoulder strap 144 is multi-layered, including one or more inner layers in addition to an outer layer that forms outward-facing side 170 and an inner layer that forms the inward-facing side.

Locking mechanism 178, when engaged, pushes against shoulder strap 144 to increase a friction force between shoulder strap 144 and outward-facing side 170 of shoulder strap 172. The friction force is increased enough to prevent shoulder strap 144 from sliding relative to shoulder pad 172. In the example of FIG. 1, locking mechanism 178 is housed in an end loop 176(4) of shoulder pad 172, where it can be easily accessed by photographer 102. Where shoulder strap 144 includes a sheath instead of loops 176, locking mechanism 178 may be housed in a portion of the sheath that is also easily accessible by photographer 102 (e.g., near a chest of photographer 102).

Figure 2:
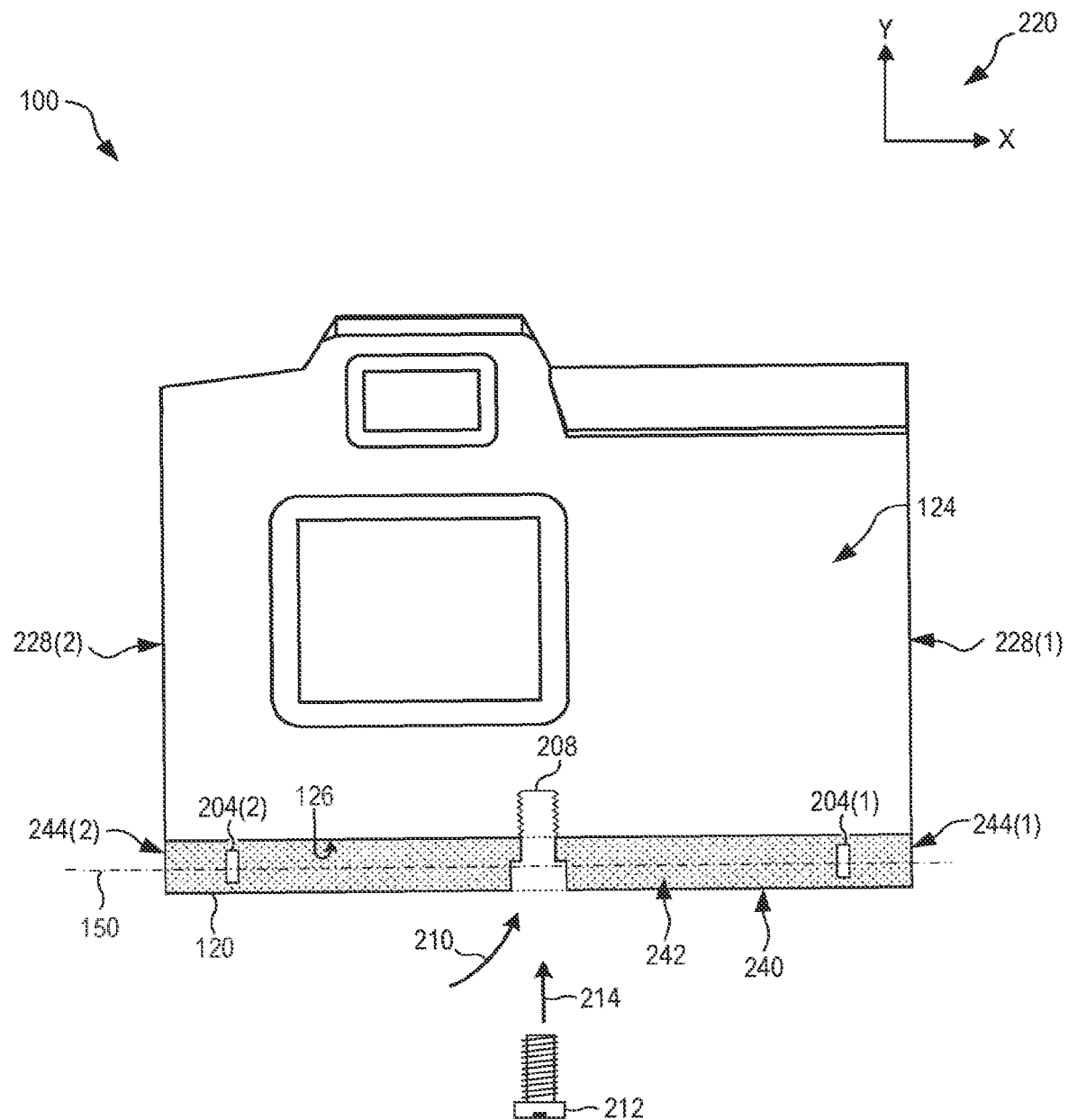
FIGS. 2 and 3 are rear and side views, respectively, of the camera of FIG. 1 that illustrate how a base attachment affixes to the camera, in an embodiment.
Figure 3:
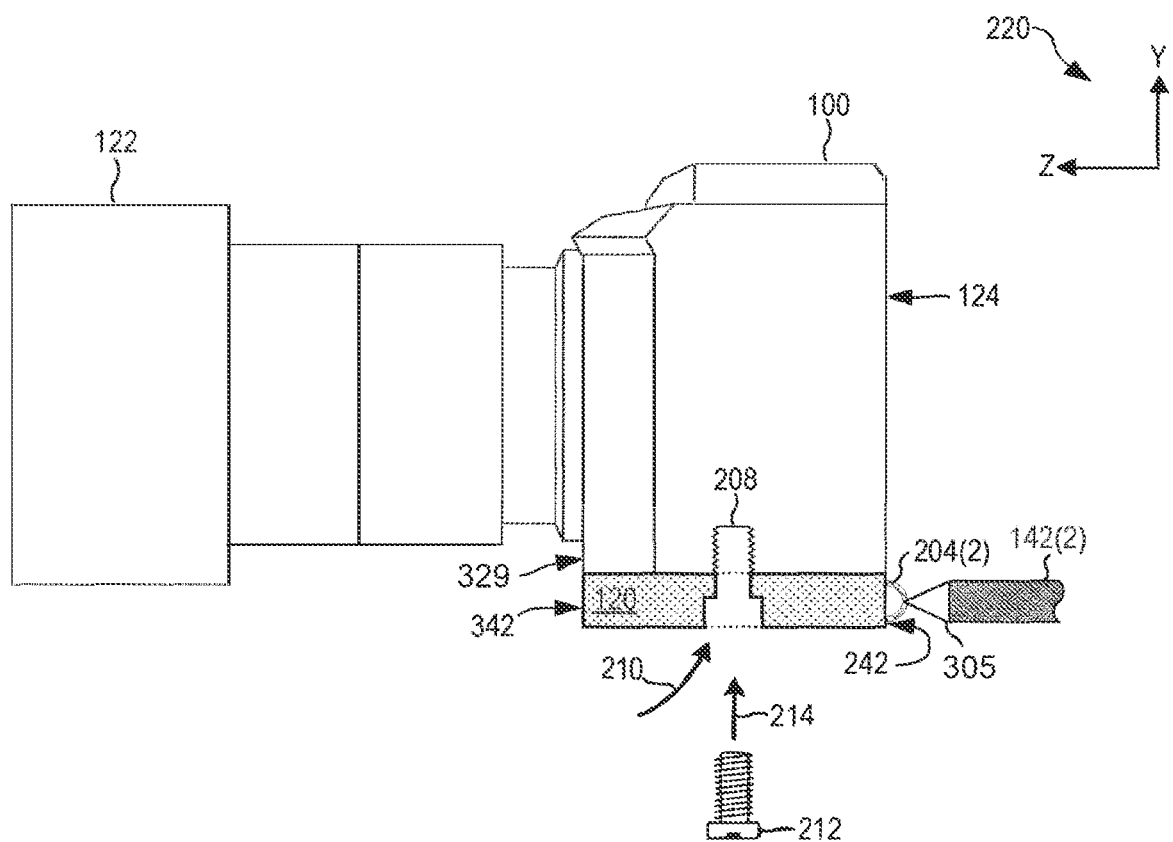
Figure 4:
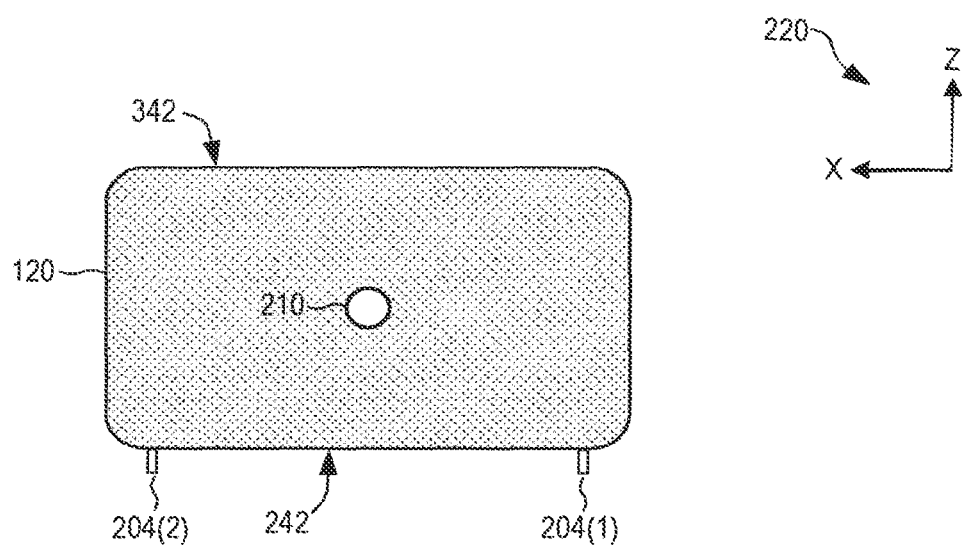
FIG. 4 is a top view of the base attachment of FIGS. 1-3, in an embodiment.

FIGS. 2 and 3 are rear and side views, respectively, of camera 100 of FIG. 1 that illustrate how base attachment 120 affixes to camera 100. FIG. 4 is a top view of base attachment 120. FIGS. 2-4 are best viewed together with the following description.

Base attachment 120 includes first and second bottom eyelets 204(1), 204(2) that are affixed to a rear surface 242 of base attachment 120. Eyelets 204 are configured to receive strap ends 142(1) and 142(2), thereby forming tether points 140(1) and 140(2) of FIG. 1. Thus, a line connecting first and second bottom eyelets 204(1), 204(2) defines rotation axis 150. A distance between first and second bottom eyelets 204(1), 204(2) may be selected to improve stability of camera 100, i.e., to prevent camera 100 from twisting about the z direction. In general, the greater the distance between first and second bottom eyelets 204(1), 204(2), the less likely camera 100 will twist. Thus, embodiments herein show first and second bottom eyelets 204(1), 204(2) located near first and second side faces 228(1), 228(2) of camera 100.

In FIG. 3, second strap end 142(2) is connected to a triangle lug ring 305 that connects to second bottom eyelet 204(2). Although not shown in FIG. 3, first strap end 142(1) may connect to first bottom eyelet 204(1) with a similar triangle lug ring. Bars, loops, circular rings, buckles, and/or rotatable couplers (e.g., swivels) may also be used to connect strap ends 142 to eyelets 204. In one embodiment, a loop of paracord, such as a Kevlar cord material, connects each of first and second bottom eyelets 204(1), 204(2) to respective strap ends 142(1), 142(2). Each paracord loop may be larger than the hole formed by one of eyelets 204, thereby facilitating the attachment and detachment of strap ends 142 to base attachment 120. The paracord loops also provide mechanical damping than can advantageously reduce motion of camera 100, especially in the vertical direction, while photographer 102 is moving. Another type of elastic cord may be used instead of paracord, such as bungee cord, nylon rope, or kernmantle rope.

Base attachment 120 forms a through-hole 210 through which a screw 212 may pass to engage with a tripod socket 208 formed into bottom face 126 of camera 100. For clarity, through-hole 210 and tripod socket 208 are shown in FIGS. 2 and 3 in cross-sectional view. When screw 212 is threaded into tripod socket 208, as indicated by arrow 214, base attachment 120 is rigidly affixed to camera 100. In the example of FIG. 2, through-hole 210 is a counterbored hole that is configured such that screw 212, when fully threaded into tripod socket 208, does not extend below a bottom surface 240 of base attachment 120 (i.e., in the negative y direction; see right-handed coordinate system 220). With this means of affixing base attachment 120 to camera 100, camera 100 can advantageously rest flat on bottom surface 240 when camera 100 is placed, for example, on a table or countertop.

Base attachment 120 is shown in FIG. 2 as having a length, in the x direction, equal to that of camera 100. More specifically, FIG. 2 shows base attachment 120 with first and second side surfaces 244(1), 244(2) that are co-planar with first and second side faces 228(1), 228(2). However, base attachment 120 may have a different length than shown in FIG. 2, i.e., first side surface 244(1) may be located before or after first side face 228(1), in the x direction. Similarly, second side surface 244(2) may be located before or after second side face 228(2), in the x direction. In one embodiment, the length of base attachment 120 is greater than that of camera 100, wherein base attachment 120 forms first and second bottom eyelets 204(1), 204(2) such that the distance therebetween is greater than the length of camera 100. In this embodiment, the increased distance between first and second bottom eyelets 204(1), 204(2) increases stability of camera 100 by preventing camera 100 from twisting about the z direction.

Base attachment 120 is shown in FIG. 3 as having a width, in the z direction, equal to that of a body of camera 100. More specifically, FIG. 3 shows base attachment 120 with rear surface 242 co-planar with rear face 124 of camera 100, and with a front surface 342 of base attachment 120 co-planar with a front face 329 of camera 100 (i.e., a front face of the body of camera 100). However, base attachment 120 may have a different width than shown in FIG. 3, i.e., rear surface 242 may be located before or after rear face 124, in the z direction. Similarly, front surface 342 may be located before or after front face 329, in the z direction.

While base attachment 120 is shown in FIGS. 2-4 as a rectangular plate, base attachment 120 may be alternatively configured based on the size and shape of camera 100. Base attachment 120 may also be configured with slots, stops, keys, and/or other physical features so that base attachment 120 can only be affixed to camera 100 in one orientation. Thus, when screw 212 is threaded into tripod socket 208, base attachment 120 does not rotate in the x-z plane due to the rotation of screw 212. Base attachment 120 may also form through-hole 210 at a different location (i.e., in the x and z directions) than shown in FIGS. 2-4, as needed to ensure that through-hole 210 aligns with tripod socket 208 to allow screw 212 to pass therethrough.

Base attachment 120 may be formed from metal (e.g., aluminum), plastic (e.g., ABS or PVC), wood, a composite material (e.g., carbon fiber reinforced polymer) or another material. When base attachment 120 is formed from a material softer than camera 100, bottom surface 240 is less likely to damage a table or countertop on which camera 100 is placed, as compared to when camera 100 rests directly on the table or countertop. When base attachment 120 is formed from a material with a hardness comparable to, or greater than, that of camera 100, bottom surface 240 may be covered with a soft material (e.g., felt, leather, plastic) to protect the table or countertop from scratches and other forms of physical damage.

Base attachment 120 may be formed by affixing eyelets 204 to a separately constructed plate (e.g., via epoxy, welding, soldering, etc.). Alternatively, base attachment 120 may be constructed to directly form eyelets 204. For example, base attachment 120 may be machined with a through-hole on each side that functions as an eyelet. Alternatively, base attachment 120 may be machined with a recess on each side; a pin affixed across the recess creates a strap mount that functions as an eyelet.

Figure 5:
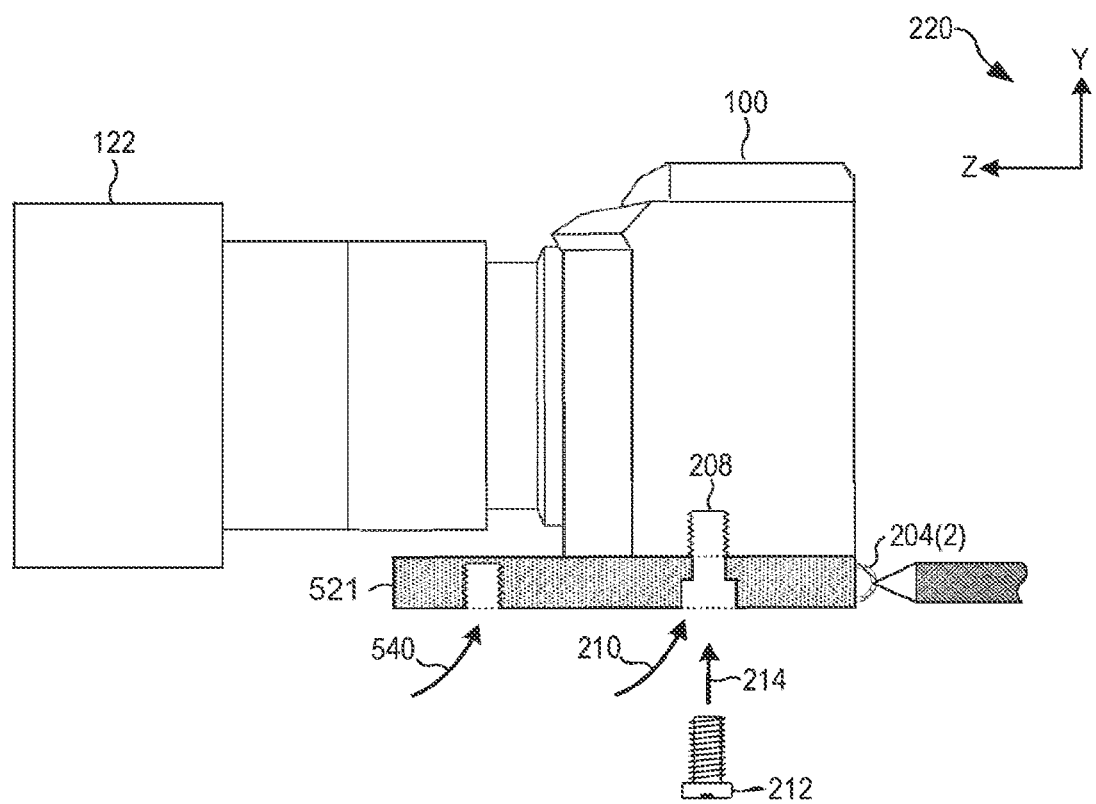
FIG. 5 is a side view of the camera of FIG. 1 that illustrates how a tongued base attachment affixes to the camera, in an embodiment.
Figure 6:
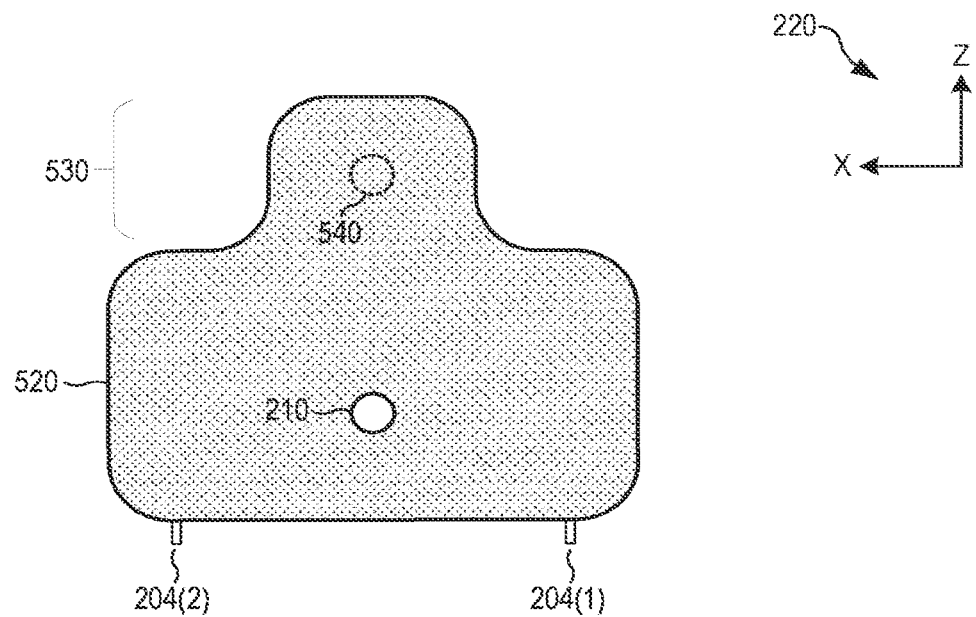
FIG. 6 is a top view of the tongued base attachment of FIG. 5, in an embodiment.

FIG. 5 is a side view of camera 100 that illustrates how a tongued base attachment 521 affixes to camera 100. FIG. 6 is a top view of tongued base attachment 521. FIGS. 5 and 6 are best viewed together with the following description.

Tongued base attachment 521 is similar to base attachment 120 of FIGS. 1-4 except that tongued base attachment 521 forms a tongue 530 that extends along the positive z direction. In addition to through-hole 210, tongued base attachment 521 also forms a threaded tripod socket 540 that allows photographer to use camera 100 and base attachment 521 with an additional camera accessory (e.g., a tripod) that requires a tripod socket. Thus, while tongued base attachment 521 uses tripod socket 208, tongued base attachment 521 forms tripod socket 540 as an alternative to tripod socket 208. For clarity, through-hole 210, tripod socket 208, and tripod socket 540 are shown in FIG. 5 in cross-sectional view.

While tongued base attachment 521 is shown in FIGS. 5 and 6 as forming tripod socket 540 centered on tongue 530 in the x and z directions, tongued base attachment 521 may form tripod socket 540 elsewhere on tongue 530. Alternatively, tongued base attachment 521 may form tripod socket 540 not on tongue 530, provided it does not interfere with through-hole 210. In one embodiment, base attachment 120 of FIGS. 1-4 forms tripod socket 540.

Figure 7:
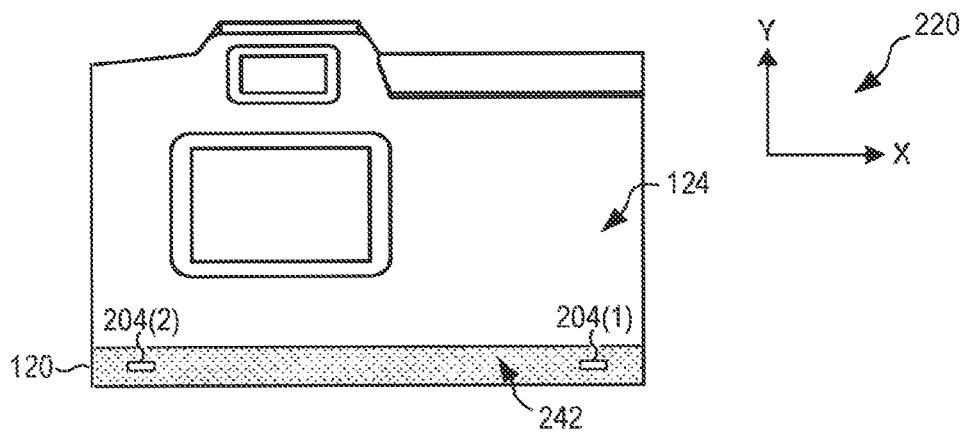
FIGS. 7-9 show alternative configurations of first and second bottom eyelets of the base attachment, in embodiments.
Figure 8:
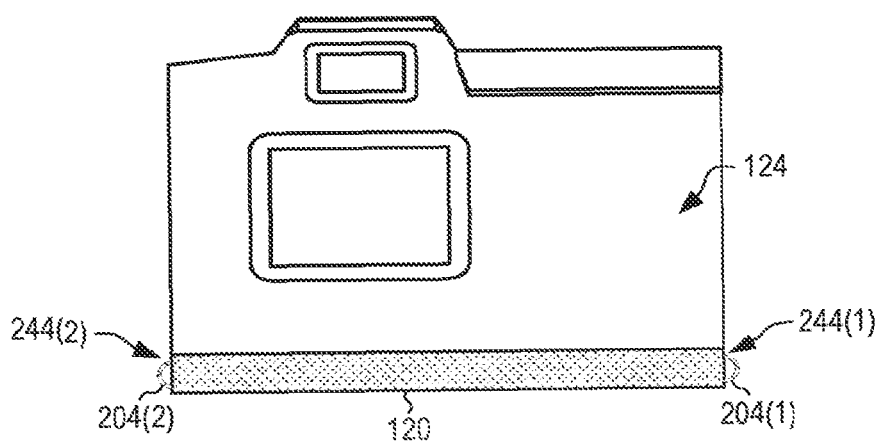
Figure 9:
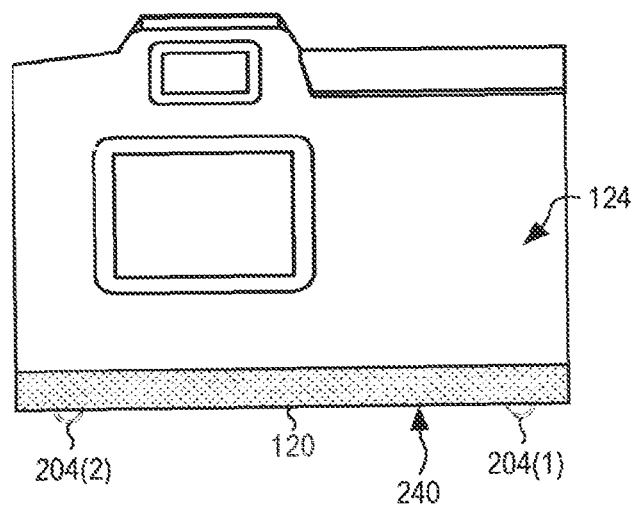

FIGS. 7-9 show alternative configurations of first and second bottom eyelets 204(1), 204(2). In FIG. 7, bottom eyelets 204 are affixed to rear surface 242, but are oriented perpendicularly, as compared to FIGS. 2-4. That is, each of bottom eyelets 204 forms a loop that lies flat in the x-z plane. In FIG. 8, first bottom eyelet 204(1) is affixed to first side surface 244(1) of base attachment 120, and second bottom eyelet 204(2) is affixed to second side surface 244(2) of base attachment 120. In FIG. 9, bottom eyelets 204 are affixed to bottom surface 240 of base attachment 120. While FIGS. 7-9 show these alternative configurations with base attachment 120, they may also be implemented with tongued base attachment 521.

In some embodiments, bottom eyelets 204 are affixed directly to camera 100 without any base attachment (e.g., base attachment 120 or tongued base attachment 521). Bottom eyelets 204 may be affixed directly to camera 100 with a position, geometry, and/or orientation similar to those shown in FIGS. 1-9. In other embodiments, bottom eyelets 204 are affixed directly to camera 100 in addition to a pair of top eyelets located at or near a top of camera 100. These top eyelets may be similar to those currently included with prior-art cameras. Thus, in these embodiments, camera 100 has four eyelets, of which any two may be used with a camera strap. These embodiments provide the photographer with several ways to affix the camera strap to the camera. For example, the photographer may connect a camera strap to the top eyelets, as is currently done with prior-art cameras. Alternatively, the photographer may use the bottom eyelets to provide the functionality shown in FIGS. 1-9. The photographer may also use both of the eyelets on one side of the camera (e.g., top left and bottom left), or eyelets located on opposite corners (e.g., top left and bottom right).

Figure 10:
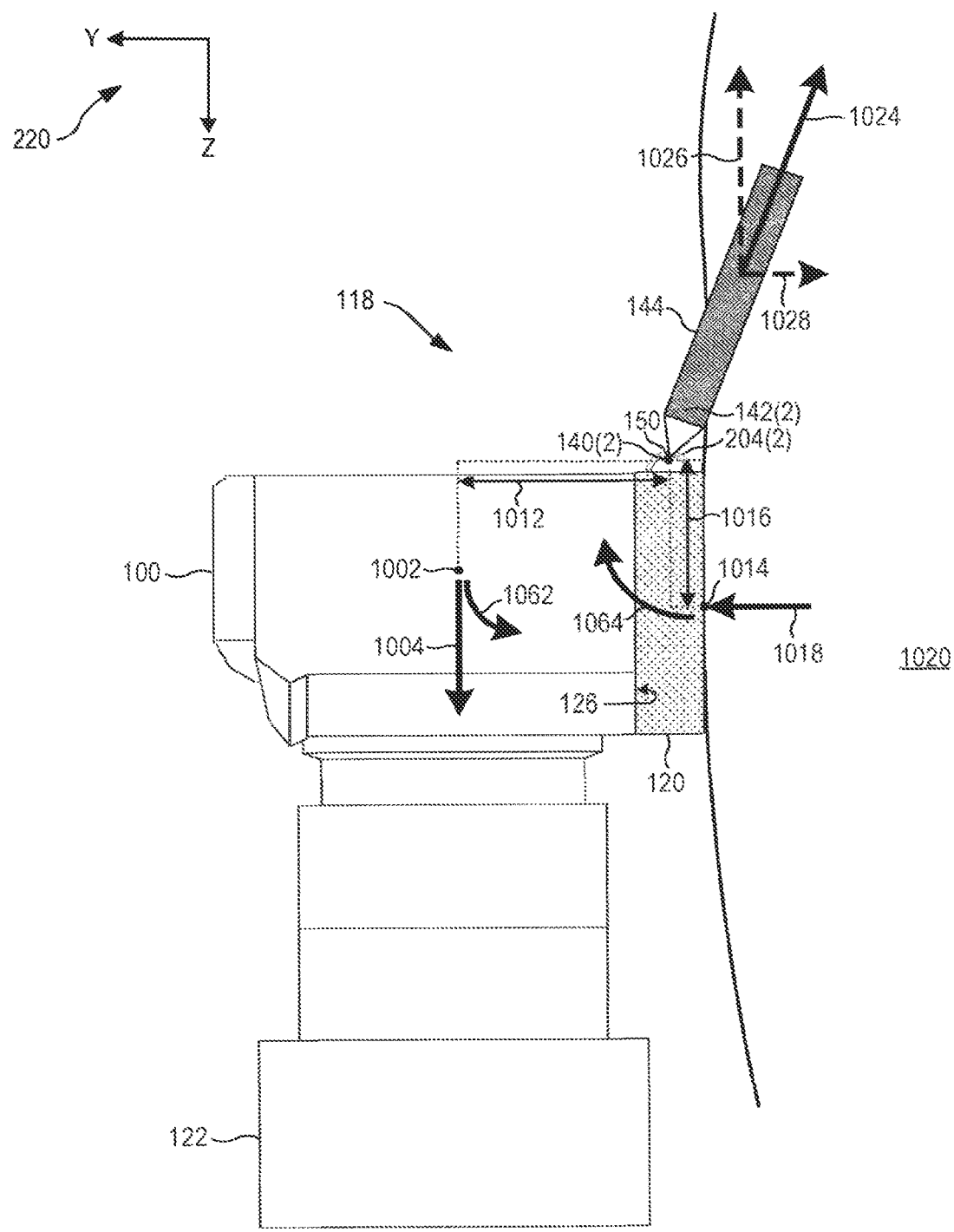
FIG. 10 is a force diagram that shows how the stabilizing camera carrying system of FIG. 1 positions the camera against the hip of the photographer of FIG. 1 such that a lens points downward, in an embodiment.

FIG. 10 is a force diagram that shows how stabilizing camera carrying system 118 positions camera 100 against a hip 1020 of photographer 102 such that lens 122 points downward in the positive z direction (see right-handed coordinate system 220). For clarity in the following description, photographer 102 and camera 100 are oriented similarly to FIG. 1, i.e., photographer 102 stands vertically with shoulder strap 144 slung over left shoulder 174, wherein hip 1020 is the right hip of photographer 102. Gravity is oriented in the positive z direction.

Second strap end 142(2) connects to second bottom eyelet 204(2) to create second tether point 140(2). Although not shown in FIG. 10, first strap end 142(1) also connects to first bottom eyelet 204(1) to create first tether point 140(1) (see FIG. 1). A line joining tether points 140(1) and 140(2) forms rotation axis 150, which is parallel to the x axis. That is, rotation axis 150 is parallel to both bottom face 126 and rear face 124 of camera 100. A weight 1004 of camera 100 acts downward on a center-of-mass (COM) 1002 of camera 100 (i.e., in the positive z direction). COM 1002 is displaced from rotation axis 150 in the y direction by a first displacement 1012. A product of first displacement 1012 and weight 1004 forms a first torque 1062 that tends to rotate camera 100 (and lens 122, when attached to camera 100) about rotation axis 150. First torque 1062 is oriented clockwise about the positive x axis, and thus drives lens 122 toward hip 1020.

To ensure that first torque 1062 is oriented clockwise about the positive x axis, as shown in FIG. 10, first displacement 1012 must be positive. That is, a y coordinate of COM 1002 must be greater than a y coordinate of rotation axis 150. Thus, when camera 100 rests on bottom surface 240 of base attachment 120, as in FIG. 3, rotation axis 150 is located beneath COM 1002. Base attachment 120 of stabilizing camera carrying system 118 contacts right hip 1020 at an effective contact point 1014 that is displaced from rotation axis 150 in the z direction by a second displacement 1016. At effective contact point 1014, hip 1020 exerts onto base attachment 120 a normal force 1018. A product of second displacement 1016 and normal force 1018 forms a second torque 1064 that tends to rotate camera 100 around rotation axis 150 in a direction opposite to that of first torque 1062 (i.e., second torque 1064 is oriented counterclockwise about the positive x axis). Hip 1020 generates normal force 1018 with a magnitude such that the first torque 1062 and second torque 1064 have equal magnitudes and opposite directions, and therefore sum to zero when camera 100 is at rest on hip 1020.

In response to weight 1004 and normal force 1018, a tension 1024 forms along shoulder strap 144. A vertical component 1026 of tension 1024 has the same magnitude as weight 1004, but is oriented in the opposite direction (i.e., in the negative z direction) such that a sum of forces in the z direction acting on camera 100 is zero when camera 100 rests on hip 1020. A horizontal component 1028 of tension 1024 has the same magnitude as normal force 1018, but is oriented in the opposite direction (i.e., in the negative y direction) such that a sum of forces in the y direction acting on camera 100 is zero when camera 100 is at rest on hip 1020.

While FIG. 10 shows camera 100 at rest against the right hip of photographer 102 (i.e., hip 1020), similar arguments apply when camera 100 is at rest on a different part of photographer 102, such as a stomach, a back, or a left hip of photographer 102.

Figure 11:
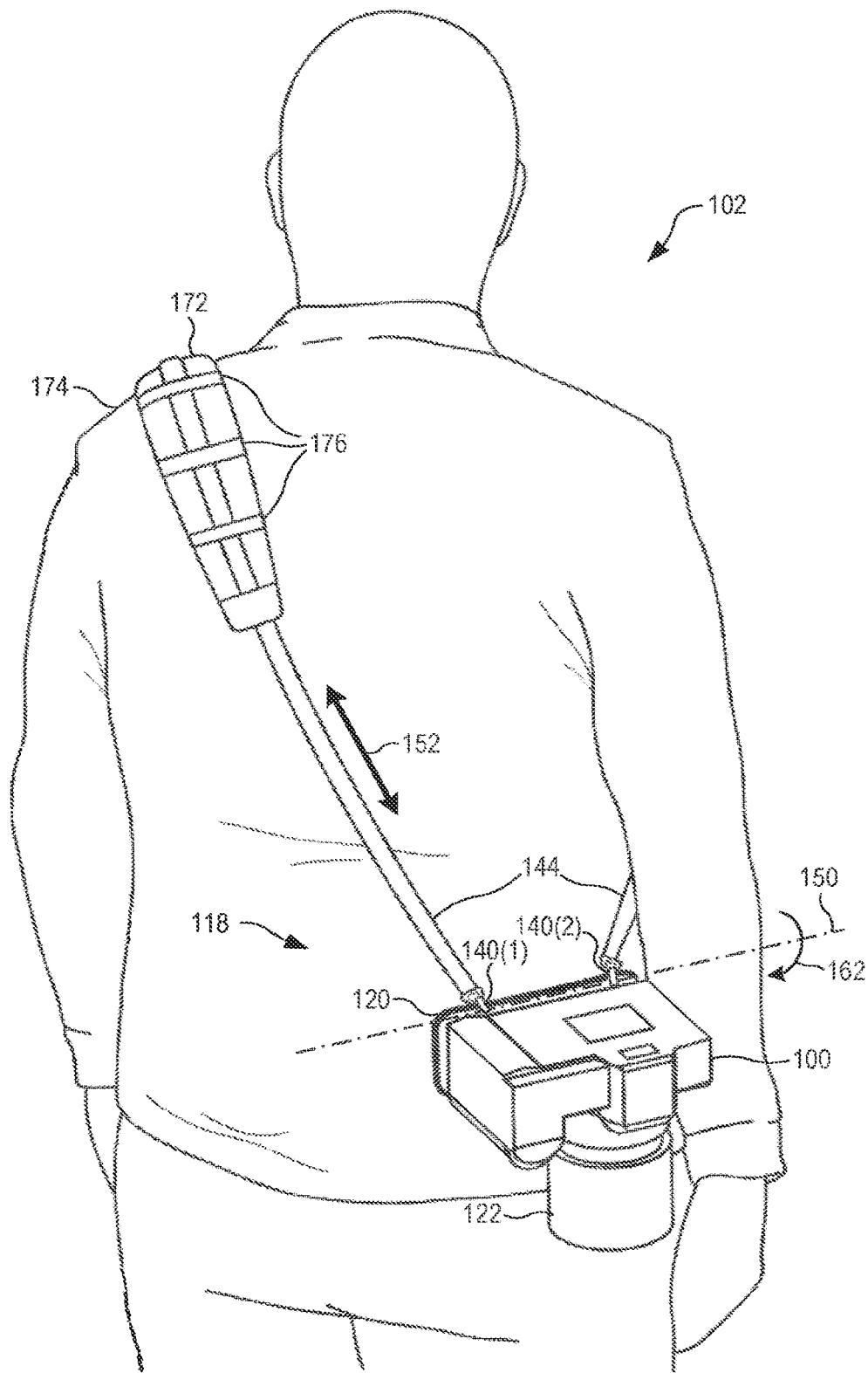
FIG. 11 is a rear view of the photographer of FIG. 1 using the stabilizing camera carrying system of FIG. 1 to position the camera toward a back of the photographer, in an embodiment.

FIG. 11 is a rear view of photographer 102 using stabilizing camera carrying system 118 to position camera 100 toward a back of photographer 102. Like FIG. 1, photographer 102 carries camera 100 with shoulder strap 144 running over shoulder pad 172 positioned on shoulder 174. First and second tether points 140(1), 140(2) define rotation axis 150, about which camera 100 can rotate such that lens 122 points downward. Photographer 102 may choose to carry camera 100, as shown in FIG. 11, when photographer 102 is walking or kneeling, and temporarily not using camera 100. In this case, photographer 102 may position camera 100 toward his back to prevent camera 100 from swinging back-and-forth while walking. When photographer engages locking mechanism 178 (see FIG. 1) so that shoulder strap 144 cannot slide along direction 152, camera 100 is further stabilized in the position shown in FIG. 11, thus protecting camera 100 while photographer 102 is moving (e.g., walking, kneeling, riding a bicycle, running, hiking, climbing, etc.) and preventing camera 100 from inhibiting movement of photographer 102.

Figure 12:
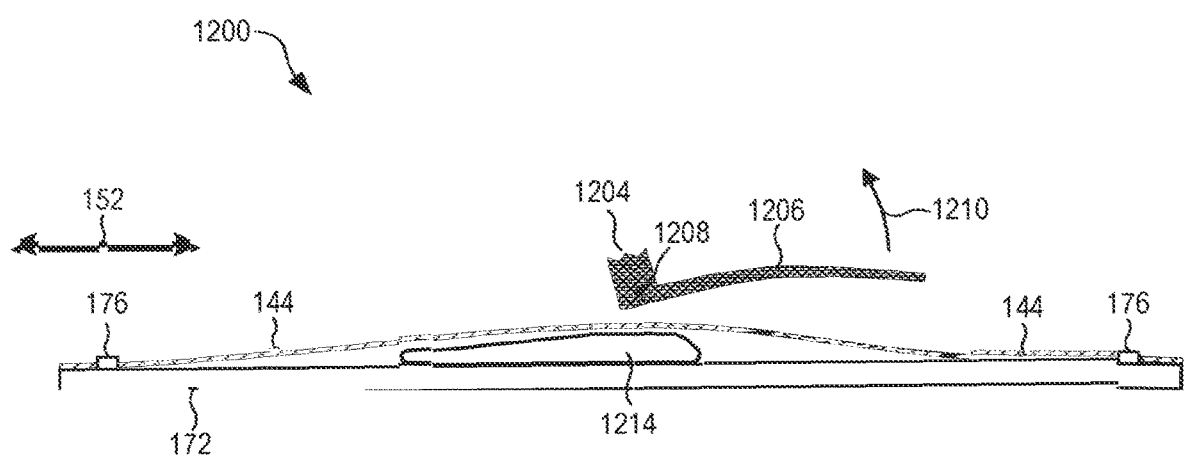
FIGS. 12 and 13 are cross-sectional side views of a cam buckle that is one example of a locking mechanism of the stabilizing camera carrying system of FIG. 1, in an embodiment.
Figure 13:
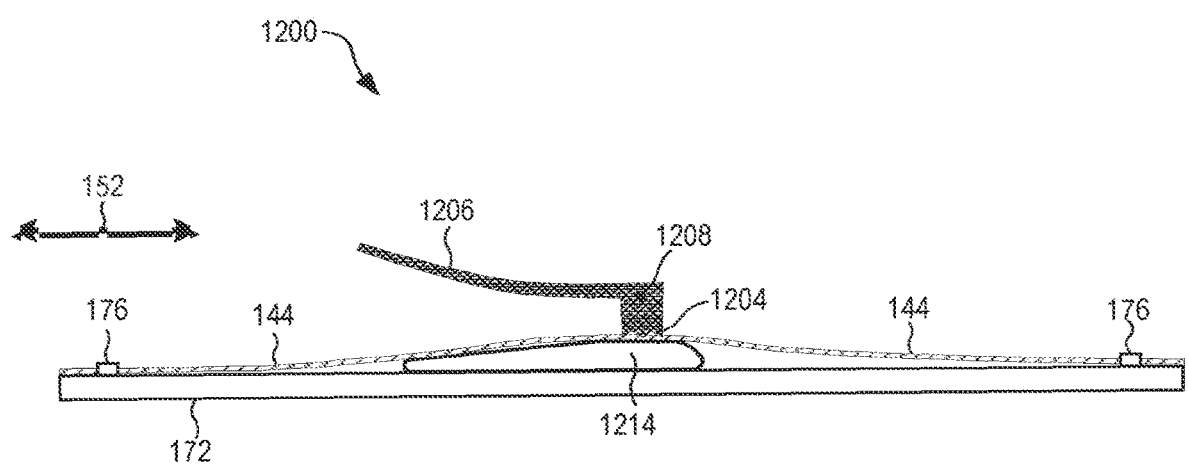

FIGS. 12 and 13 are cross-sectional side views of a cam buckle 1200 that is one example of locking mechanism 178. In FIG. 12, cam buckle 1200 is shown in an open, or unlocked, position so that shoulder strap 144 may freely translate relative to shoulder pad 172 along direction 152. In FIG. 13, cam buckle 1200 is shown a closed, or locked, position so that shoulder strap 144 cannot translate relative to shoulder pad 172. Cam buckle 1200 is affixed to shoulder pad 172 (e.g., sewn or riveted) so that cam buckle 1200 cannot slide relative to shoulder pad 172.

Cam buckle 1200 includes a lever 1206 with a textured surface 1204. To change cam buckle 1200 from the unlocked position of FIG. 12 to the locked position of FIG. 13, lever 1206 is moved in direction 1210 so that lever 1206 and textured surface 1204 rotate counter-clockwise about an axis 1208. In the locked position, textured surface 1204 physical couples with shoulder strap 144 to increase friction between shoulder strap 144 and a platform 1214 of cam buckle 1200, thereby locking shoulder strap 144 in place. Textured surface 1204 may be a knurled surface, a serrated surface, or any other surface designed to grab shoulder strap 144. To change cam buckle 1200 from the locked position to the unlocked position, lever 1206 is moved opposite to direction 1210 so that lever 1206 and textured surface 1204 rotate clockwise about axis 1208.

Although not shown in FIGS. 12 and 13, cam buckle 1200 includes two side plates that support ends of a pin that defines axis 1208. The side plates cooperate with lever 1206 and platform 1214 to define a channel through which shoulder strap 144 passes. The sides plates and/or lever 1206 may be configured to increase friction therebetween when lever 1206 is in the closed position, thereby ensuring that lever 1206 remains in the closed position.

While FIGS. 12 and 13 show cam buckle 1200 as one example of locking mechanism 178, a different type of fastener may be used as locking mechanism 178 to secure shoulder strap 144 relative to shoulder pad 172. For example, locking mechanism 178 may be a cam lever that directly presses shoulder strap 144 and shoulder pad 172 together to increase friction therebetween. Alternatively, locking mechanism 178 may be a flip-top buckle, military-style buckle, watch clasp, or another type of fastener that can be actuated to secure and release shoulder strap 144 relative to shoulder pad 172.

Shoulder strap 144, shoulder pad 172, and locking mechanism 178 may be used, with or without base attachment 120, by a wearer to carry an object other than camera 100 over the wearer's shoulder. For example, a wearer may use shoulder strap 144, shoulder pad 172, and locking mechanism 178 to carry a gun or rifle against the wearer's hip and oriented with a barrel of the gun/rifle pointing downward (i.e., similar to how the gun would be positioned in a holster). The wearer may engage locking mechanism 178 to help prevent the gun/rifle from sliding back-and-forth while the wearer is moving (e.g., walking, crouching, kneeling, etc.). Other objects that may be similarly carried over the user's shoulder include handbags (e.g., purses, pocketbooks), diaper bags, sling bags, backpacks, computer laptop bags, messenger bags, camera bags, sporting equipment (e.g., archery bows), binoculars, musical instrument cases, etc.

Figure 14:
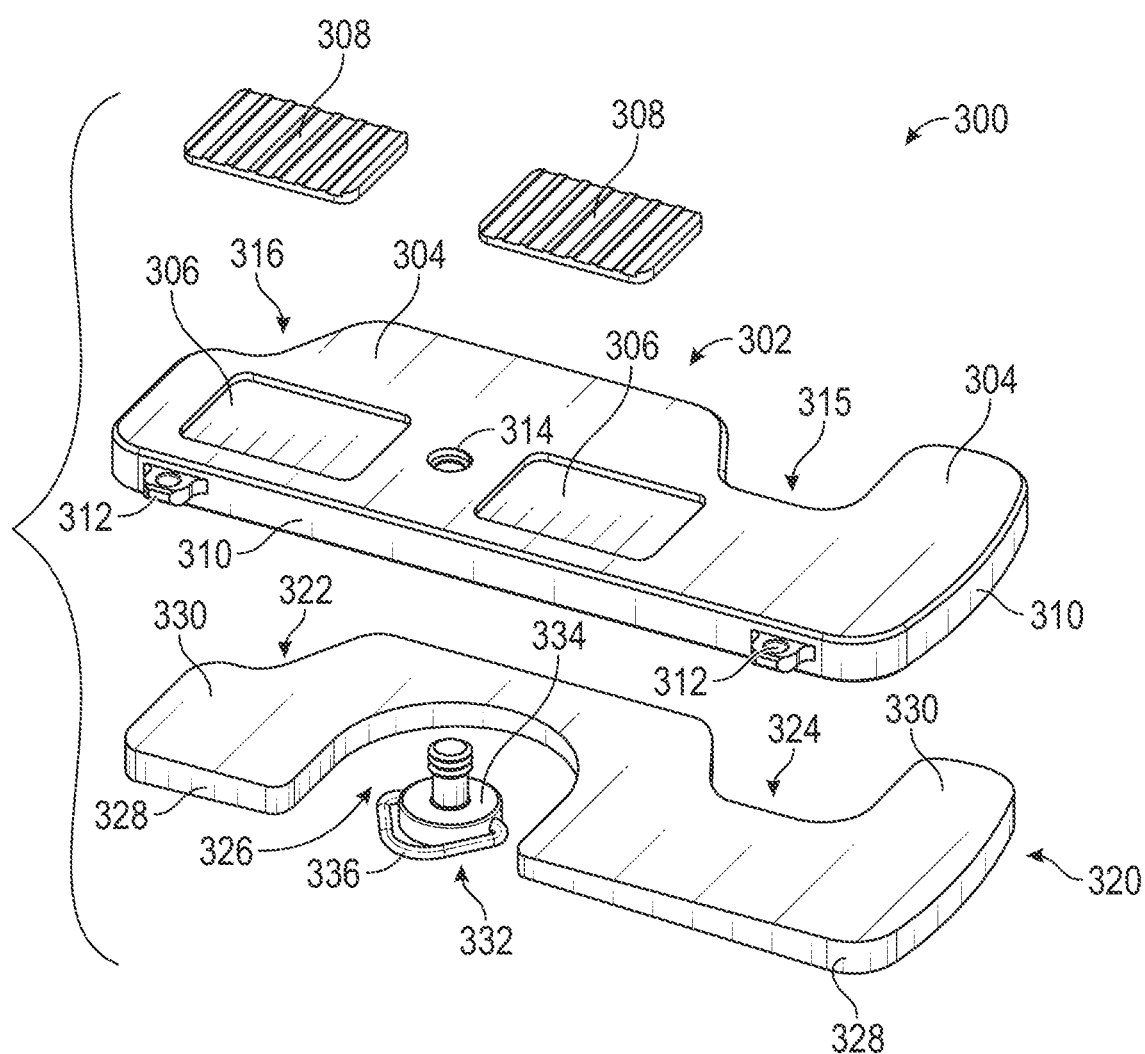
FIG. 14 is an exploded perspective view of the camera base attachment in another embodiment.

Referring to FIG. 14, a camera base attachment 300 is illustrated in another embodiment. As shown, the base attachment 300 includes a two-piece construction comprising a base plate 302 and a base plate insert 320 that connects to the base plate 302. According to the view in FIG. 14, the upper planar surface 304 may include one or more depressions 306 that receive grip pads 308. These grip pads provide additional frictional resistance so that the base attachment does not slip or shift when the base attachment is secured to the camera. The base plate insert 320 is preferably made of a resilient elastomeric material like rubber. This insert therefore provides some shock protection to the base attachment and prevents the base attachment from scratching surfaces upon which the camera may be placed (such as the hood of a vehicle or a glass surface).

Like the prior camera base attachment embodiment, this embodiment also includes eyelets 312 that may receive eyelets used to secure the base attachment to a camera strap arrangement. While the eyelets are shown at opposite ends of one side of the base plate 302, it should also be understood that the eyelet can be placed at other locations on the base plate as described with the previous embodiments.

The shape of the base attachment 300 includes features which enable it to match the outer peripheral shape of a camera to which the attachment is secured. The exemplary features shown in this embodiment with respect to the shape include a notch 316 and a slot 315, which may follow the shape of many rear sides of cameras. It should be understood however that the features such as the notch 316 and the slot 315 may be modified to adapt the camera base attachment to any shaped camera. In particular, the outer peripheral surface or outer rim 310 may adopt any suitable shape that may be encountered with respect to a camera for which the base attachment is to be secured.

The base plate insert 320 has a complementary shape as compared to the base plate 302. Accordingly, the base plate insert 320 also includes a corresponding notch 322 and slot 324. The outer peripheral surface 328 of the base plate insert can also be modified in shape to fit the shape of the base plate 302. The base plate insert further includes a central cutout 326 that is sized to receive camera locking screw 332 and a gap or space between the interior edges of the cutout and the outer or peripheral surface of the camera locking screw 332. This gap enables a user to conveniently grasp the D-ring 336 for removing and attaching the screw 332. If more force is necessary to remove or attach the base plate to the camera, the screw 332 also includes an Allen screw adapter socket 333 to receive an Allen wrench.

Figure 15:
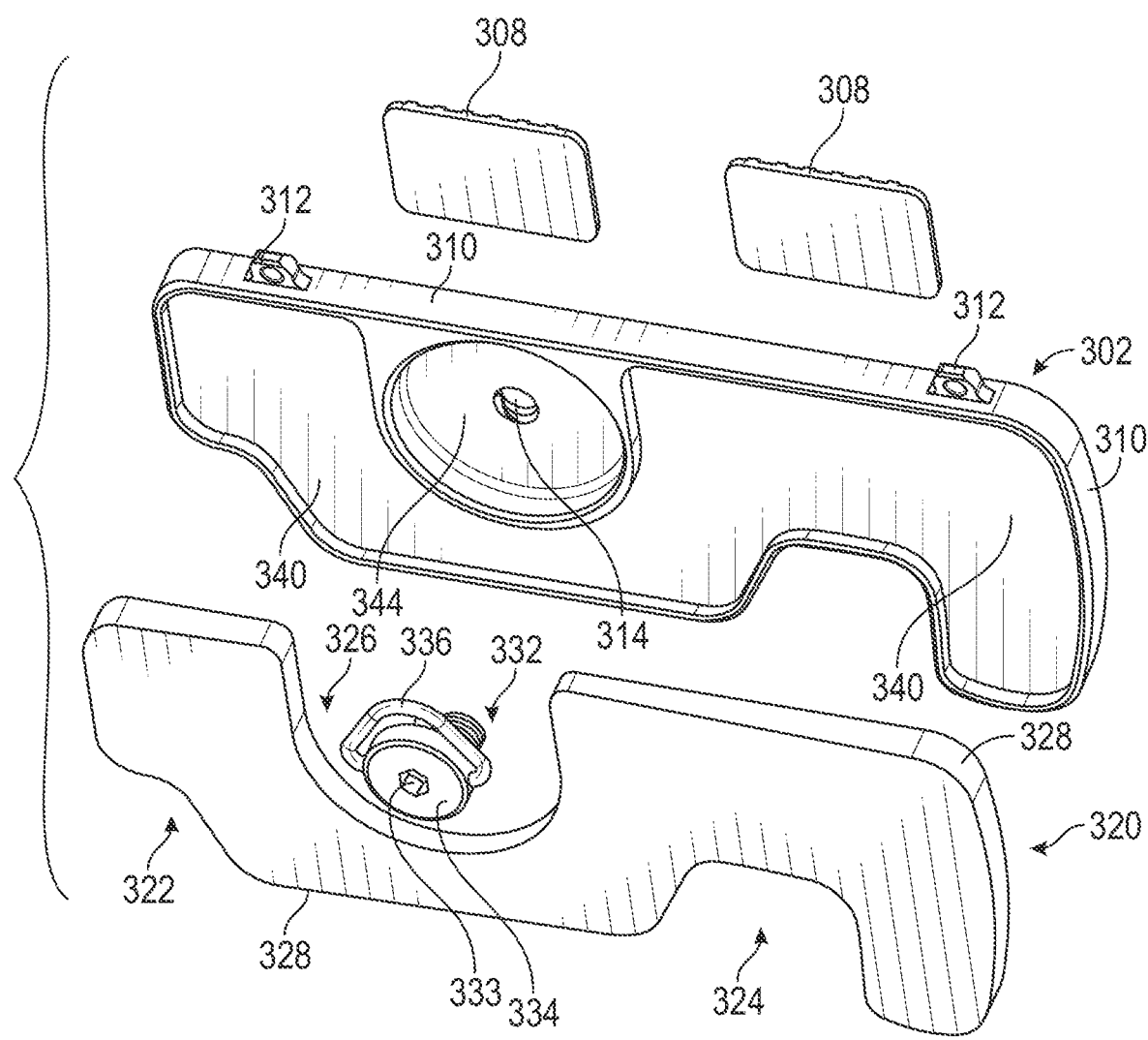
FIG. 15 is a lower or bottom exploded perspective view of the embodiment of FIG. 14.
Figure 16:
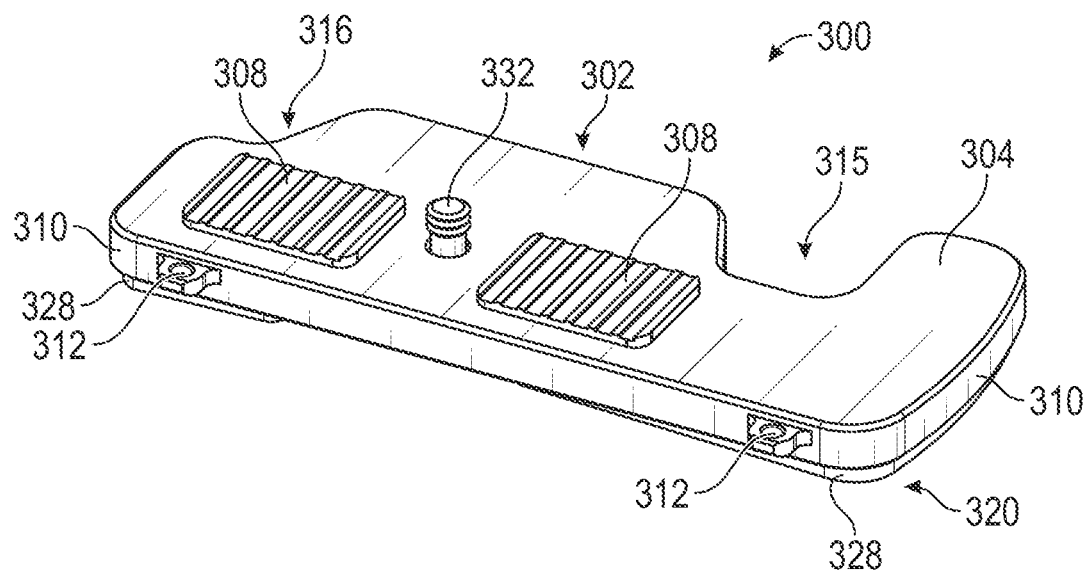
FIG. 16 is a top perspective view of the embodiment of FIG. 14.

Referring also to FIG. 15, this perspective view shows further details of the camera base attachment from a lower surface as the camera base attachment is oriented in this figure. The base plate insert 320 is received within the cavity formed by the outer rim 310 such at the outer peripheral surface 328 of the base plate insert 320 abuts the interior peripheral surface of the outer rim 310. The base plate 302 further comprises a circular shaped screw chamber 344 with a screw hole 314 centered on the chamber 344. The threaded post of the screw 332 is placed through the screw hole 314 and engages with the tripod socket 208 of a camera, as described with respect to the previous embodiments. The depth of the screw chamber 344 is sufficient to prevent the exposed exterior surface of the screw head 334 from protruding beyond the exposed lower surface of the base plate insert 320.

Figure 17:
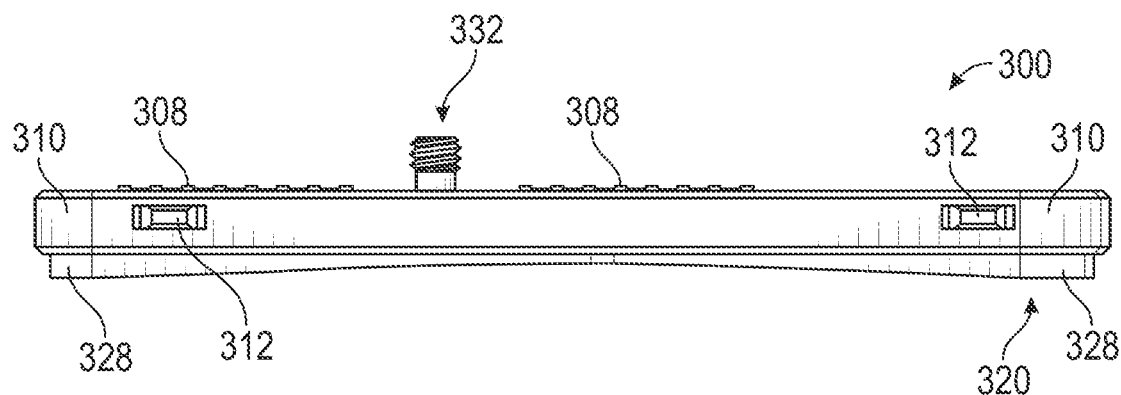
FIG. 17 is a side elevation view of the embodiment of FIG. 14.
Figure 18:
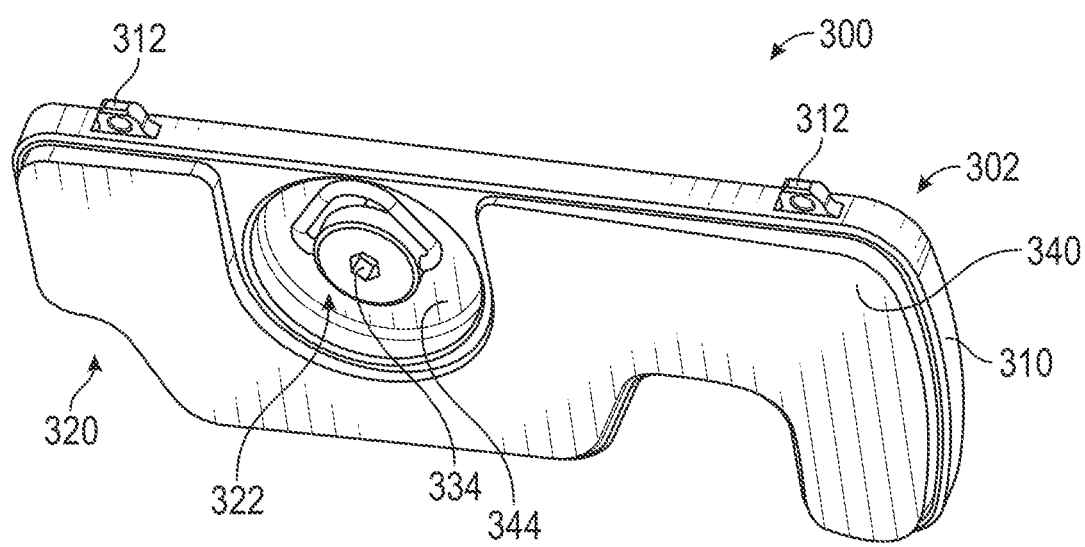
FIG. 18 is a bottom perspective view of the embodiment of FIG. 14.

Referring also to FIGS. 17 and 18, the camera base attachment 300 is shown as assembled with the camera locking screw 332 in place. As shown, the base plate insert 320 extends below the lower edge of the outer rim 310 and further, the lower surface of the base plate insert 320 has a slight concave curvature in which the opposite ends of the base plate insert 320 are slightly thicker than a center area of the base plate insert. This concave shape of the insert 320 matches the convex curvature of a user's body to provide better comfort during use.

FIG. 18 also shows the tripod post opening 346 formed on the exposed surface of the screw head 334. The opening 346 is adapted to receive the connecting-post or screw of a tripod (not shown). Although FIG. 18 illustrates a hexagon shaped opening 346, it should be understood the opening 346 can be threaded or have any other shaped opening to receive the particular type of connecting-post of the tripod.

As with the prior described embodiment, if the photographer wishes to carry the camera, the camera base attachment 300 is secured to the base of the camera, and the shoulder strap ends are secured to the eyelets. If the user wishes to attach the camera to a tripod or wishes to separate the camera from the base attachment for any other reason, the user grasps the D-ring 336 and unscrews the camera locking screw 332 enabling the camera to be separated from the camera base attachment. The central location of the D-ring 336 on the baseplate insert 320 makes it very simple for a photographer to attach or reattach the base attachment to the camera.

Figure 19:
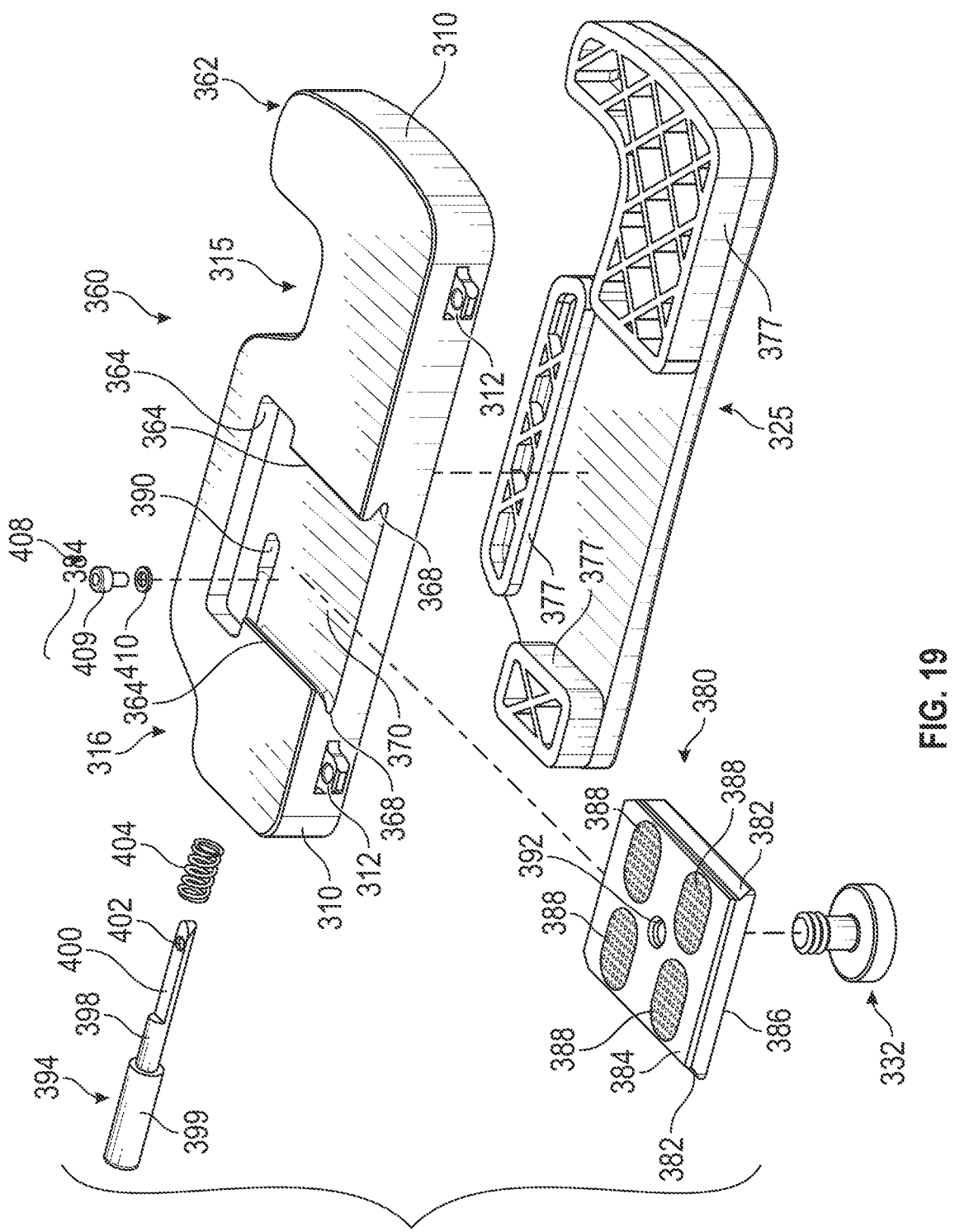
FIG. 19 is an exploded perspective view of a camera base attachment in another embodiment that incorporates a tripod adapter.
Figure 20:
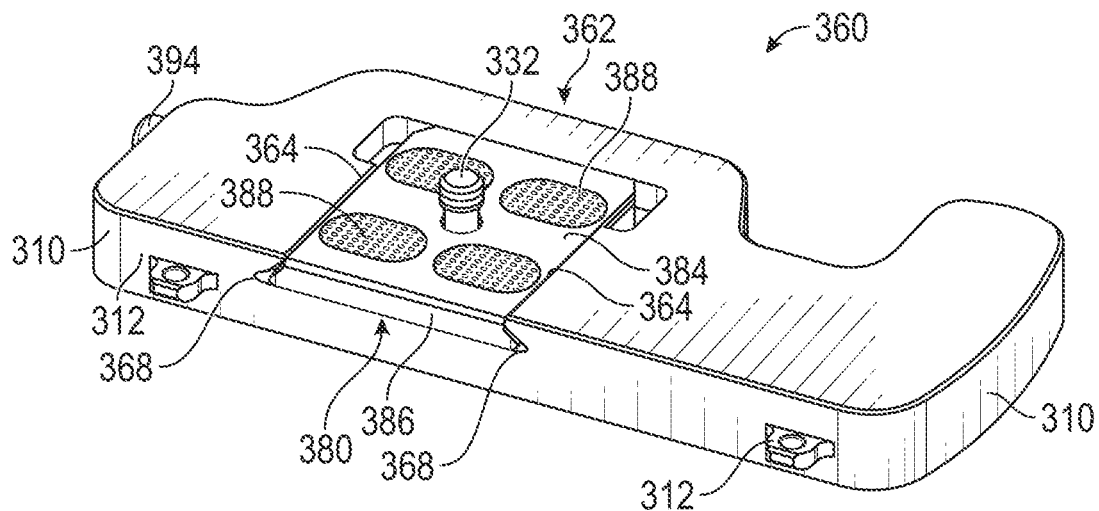
FIG. 20 is a perspective view of the embodiment of FIG. 19 showing the tripod adapter separated from the camera base attachment.
Figure 21:
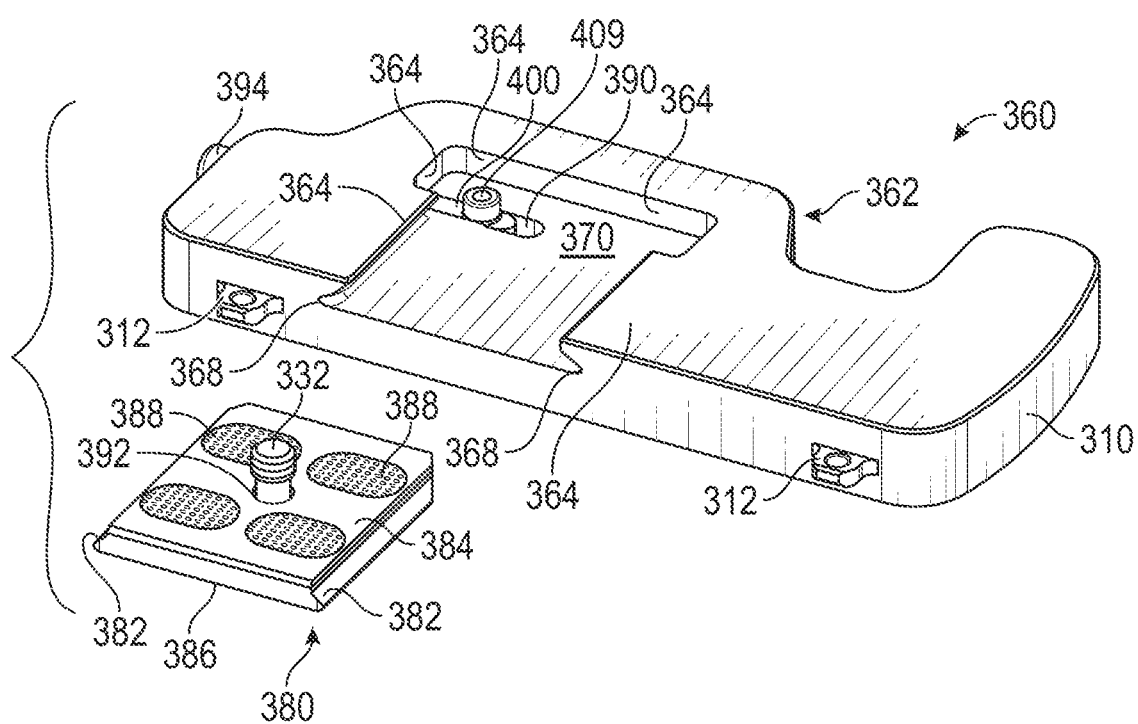
FIG. 21 is a perspective view of the embodiment of FIG. 19 showing the tripod adapter connected to the camera base attachment.

FIGS. 19-21 illustrates yet another embodiment of a camera base attachment 360, this embodiment also incorporating functionality associated with a tripod adapter 380. FIG. 19 shows the base attachment 360 having a similar shape as the base attachment 300 including the slot 315 and notch 316. The eyelets 312 also illustrated as being in similar positions on the outer rim or outer peripheral surface 310 of the base plate 362.

The base plate 362 adopts structural features to accommodate attachment and removal of the tripod adapter 380. Specifically, the base plate 362 has a large central slot defined by interior edges or sidewalls 364. The two facing or opposing sidewalls 364 each have a V-shaped slot cut-out or recess 368.

Similar to the embodiment of FIG. 14, the base attachment 360 also includes a base plate insert 375 that is preferably made of a resilient elastomeric material to provide shock protection and to prevent scratching surfaces upon which the camera may be placed. Instead of making the base plate insert 375 a solid member, raised areas 377 may be provided to reduce the weight yet maintain adequate stiffness and support for the base plate 362 along the periphery thereof.

The tripod adapter 380 is selectively connected or disconnected from the base plate 362 enabling the base attachment 360 to provide distinct functionality for carrying a camera and conveniently connecting or disconnecting the camera from a tripod. The structure of the adapter 380 includes lateral projections 382 formed on opposite lateral sides of the adapter 380. These lateral projections 382 are configured to mate with the recesses 368 of the base plate 362 as explained in detail further below. The upper surface of the tripod body 384, as the base attachment is oriented in this figure, may include a plurality of grip pads 388 which assist in increasing the frictional resistance of the base attachment with the abutting lower surface of the camera to which it is attached. As shown, there are four grip pads; however, it should be understood that these grip pads are optional and one or more of the grip pads may be used. Extending below the tripod adapter body 384 is a foot 386 which is placed into sliding contact with a lower surface 370 of the large central slot of the base plate 362. A screw hole 392 extends through the adapter body 384 to receive the camera locking screw 332. The screw 332 illustrated in this embodiment is also shown with the attached D-ring 336; however, it should be understood that any type of threaded screw may be used with either embodiment.

FIG. 19 also illustrates an actuator pin 394 that is used to selectively lock or unlock the tripod adapter 380 to the base plate 362. The specific construction of the actuator pin 394 comprises a smaller diameter section 398, a shoulder 396 which defines the interface between the smaller diameter section 398 and the pin body 399. A pin extension 400 extends beyond a distal end of the smaller diameter section 398 and includes a screw hole 402. A spring member 404 is placed over the pin extension 400 and resides over the smaller diameter section 398. A pin opening 390 is formed through a lateral side of the base plate 362. The pin opening 390 is exposed on the lower surface 370 of the base plate 362 as shown, and therefore forms a slot or groove therein. Referring to FIG. 20, the pin 394 and spring 404 are inserted through the pin opening 390. A retaining screw 408 with washer 410 are aligned with the screw hole 402 and the retaining screw is tightened to thereby securely fasten the actuator pin 394 to the baseplate 362. As shown, the head 409 of the retaining screw 408 extends above the lower surface 370.

Figure 22:
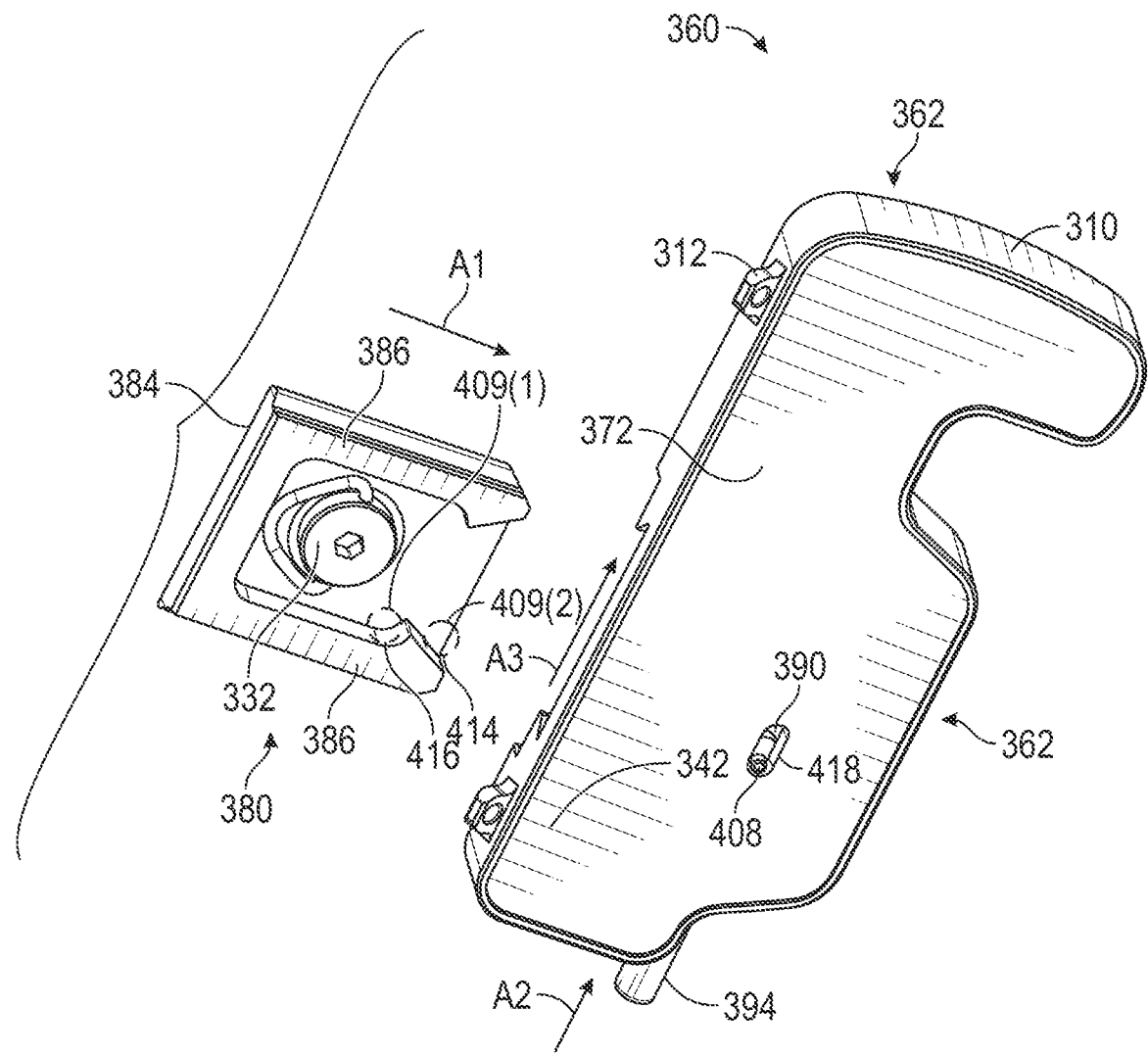
FIG. 22 is a lower or bottom perspective view of the embodiment of FIG. 19 showing the tripod adapter separated from the camera base attachment.

Referring also to FIG. 22, the lower surface of the tripod adapter 380 is illustrated in which the foot 386 has a locking feature in the form of a locking tab 412. Two positions are illustrated with respect to the location of the screw head 409 as the tripod adapter 380 is engaged with the baseplate 362. Specifically, the projections 382 are aligned with the complementary recesses 368 and the tripod adapter is slid into place. A first position of the screw head 409(1) shows the screw head initially contacts angled surface 414 of the locking tab 412. As the tripod adapter is further inserted in the direction of arrow $A_1$, in order for the screw head 409 to move to a second locked position 409(2), the actuator pin 394 must move in the direction of arrow $A_2$ thereby displacing the screw head in the direction of arrow $A_3$ thus enabling the screw head to clear the pointed tip of the tab 412. The actuator pin is moved in the direction of arrow $A_2$ by depressing the exposed end of the actuator pin 394 toward the baseplate 362. The tripod adapter 380 is locked in place by releasing pressure against the actuator pin 394 thereby causing the screw head 409 to be held against the curved surface 416 of the tab 412. Unlocking the tripod adapter is achieved by again depressing the exposed end of the actuator pin 394 enabling the screw head 409 to clear the pointed tip of the tab 412 at which point in time, the tripod adapter can be pulled away from the base plate 362.

FIG. 22 also shows the pin opening 390 communicating with a slot 418 formed on the lower surface 372 of the base plate 362. The distal end of the screw 406 is illustrated as extending into the slot 418 which assists in keeping the actuator pin 394 aligned with controlled movement along the direction of arrow $A_2$.

Figure 23:
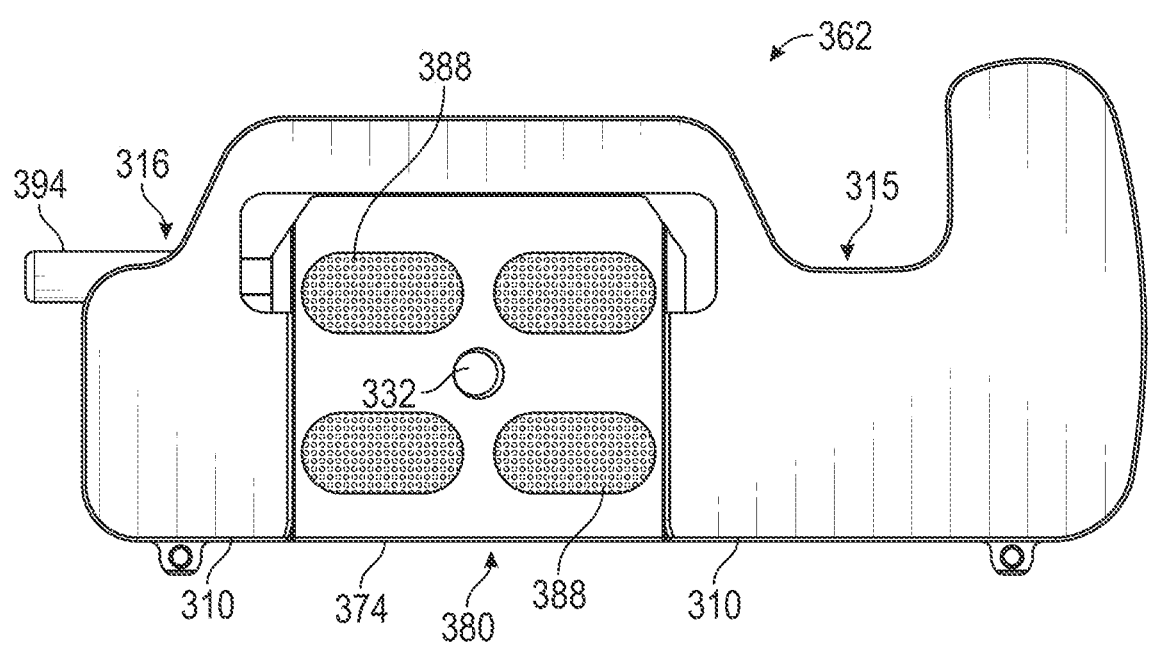
FIG. 23 is a top plan view of the embodiment of FIG. 19 showing the tripod adapter connected to the base attachment.

FIG. 23 illustrates the tripod adapter 380 engaged with the baseplate 362. The forward or front face 374 of the adapter is preferably flush with respect to the adjacent surfaces of the outer rim 310.

In operation, the tripod adapter 380 is secured to a camera by inserting the camera locking screw 332 into the tripod socket 208 of a camera. If a user wishes to mount the camera to a tripod, the user depresses the exposed end of the actuator pin 394 and slides the camera and attached tripod adapter 380 away from the baseplate 362. At that point, the user may then mount the camera to a tripod, such as by inserting the connecting-post or screw of a tripod (not shown) into the screw chamber 344 of the screw 332. In this mode, the baseplate 302 remains attached to the shoulder strap worn by the user.

If the user wishes to move the camera from the tripod and reattach the camera to the baseplate 362, the user aligns the projections 382 of the tripod adapter with the recesses 368 of the baseplate, slides the tripod adapter into the central slot, and simultaneously depresses the exposed end of the actuator pin 394. Once the tripod adapter is fully engaged with the baseplate, the actuator pin is released enabling the tripod adapter to be locked in place as shown and described with respect to position 409(2) of FIG. 22.

It should be appreciated that enhanced functionality is provided by use of the tripod adapter in which a user may conveniently connect or disconnect the camera to both a tripod and to a camera base attachment. This functionality is achieved without having to provide a separate or additional element for the tripod. The simple but reliable locking and unlocking capability of the tripod adapter enables a user to seamlessly use a camera with both a tripod and a camera carrying system.

Figure 24:
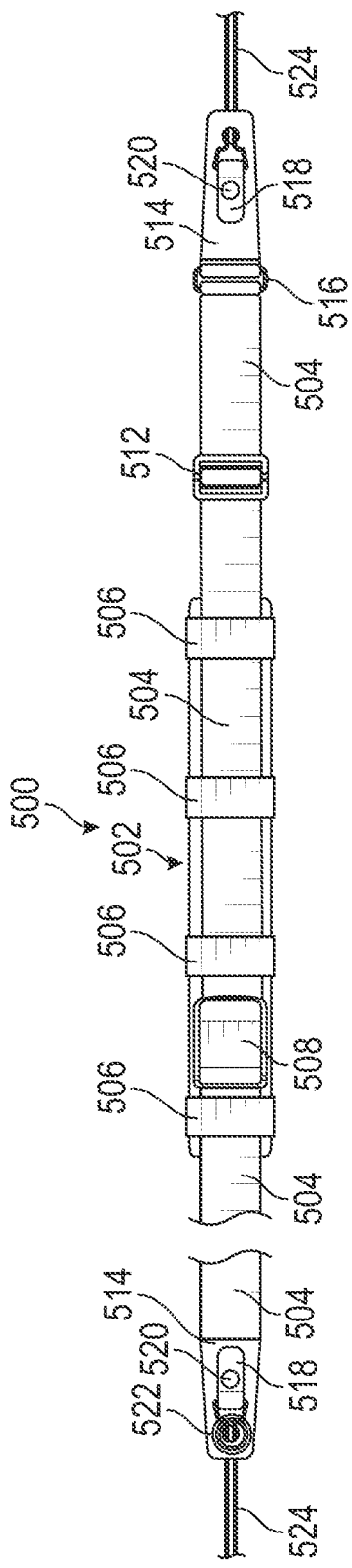
FIG. 24 is a top plan view of a shoulder strap assembly according to another embodiment for use with a shoulder strap.
Figure 25:
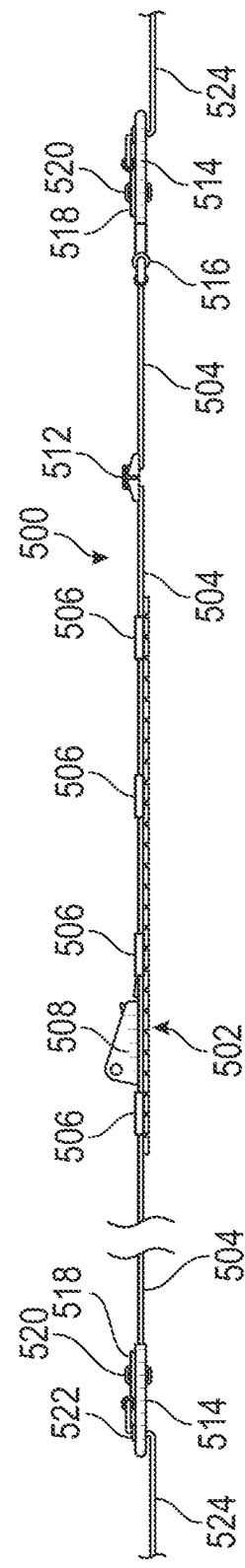
FIG. 25 is a side elevation view of the shoulder strap assembly of FIG. 24.

FIG. 24 is a top plan view of a shoulder strap assembly according to another embodiment. FIG. 25 is a side elevation view of the shoulder strap assembly of FIG. 24. As shown, components of the shoulder strap assembly 500 include a shoulder pad 502 and a main strap or webbing 504 which is secured to the shoulder pad 502 as by strap keepers 506. As seen in FIG. 25, the lower surface of the shoulder pad 502 may have grooves or other frictional enhancing features so that the shoulder pad remains securely attached to the user. The shoulder pad may be made of a flexible, resilient, and padded material which optimizes comfort. A plurality of strap keepers 506 are shown, it being understood that the number and spacing of the strap keepers can be modified. A securing device such as a cam buckle 508 is used to secure the main strap located under the cam portion of the buckle 508. Like the previous embodiment, the main strap 504 is slidable through the strap keepers 506 while the shoulder pad 502 remains fixed against a shoulder of the user. In this way, the user can selectively adjust a length of the main strap as well as to adjust the exact positioning of a camera attached to the ends of the main strap.

Figure 27:
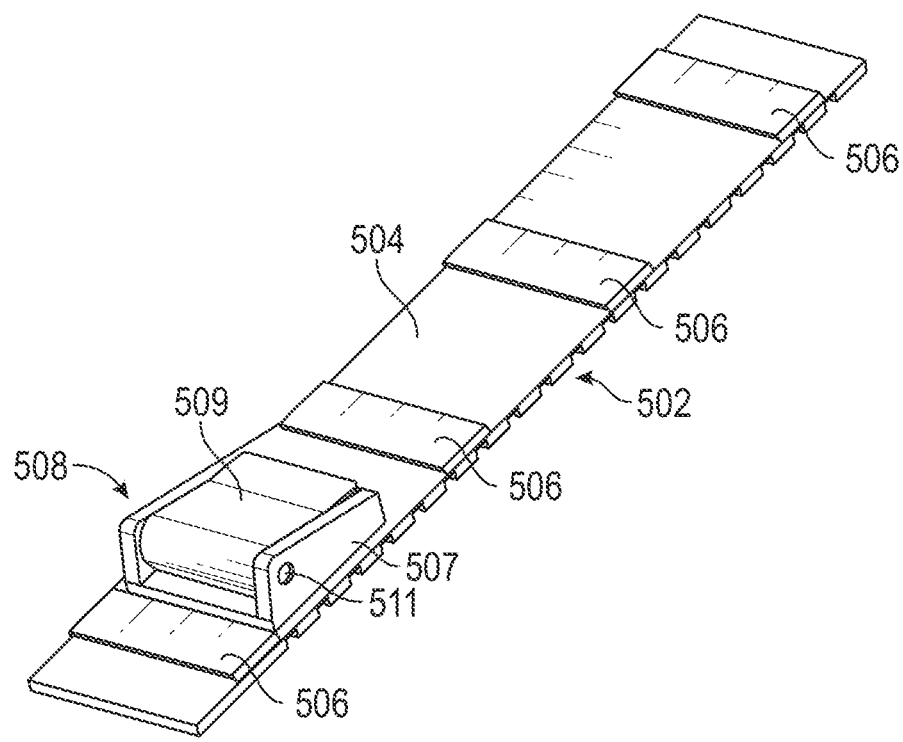
FIG. 27 is an enlarged perspective view of a center portion of the shoulder strap assembly of FIG. 24 showing a cam buckle.

Referring to the enlarged view of FIG. 27, details of the cam buckle are shown. The cam buckle has a rotatable latch 509 that is secured to a buckle base 507 as by a pin 511. According to the view in FIG. 27, rotating the latch 509 in a counterclockwise direction allows the main strap 504 to be released, while rotating the latch in a clockwise direction to the position shown in this figure locks the main strap 504 against the upper surface of the shoulder pad 502.

Figure 28:
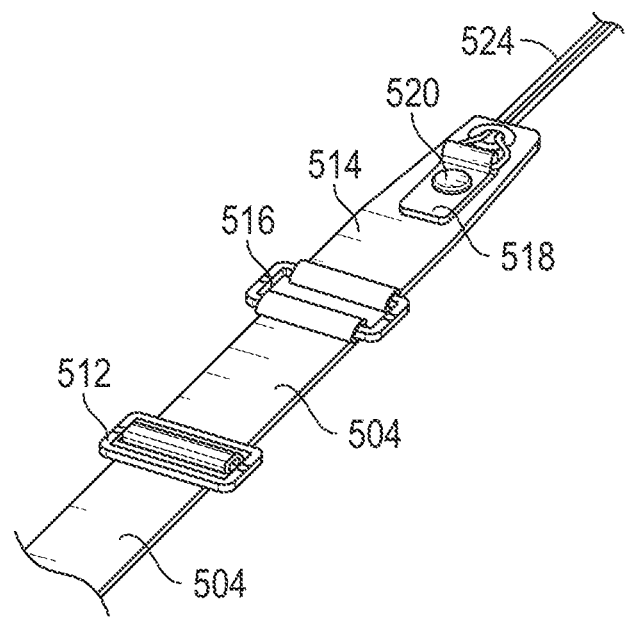
FIG. 28 is an enlarged perspective view of the other end of the shoulder strap assembly of FIG. 24.

Referring also to FIG. 28, a slide adjuster 512 is provided for adjusting a length and positioning of the main strap on the user. As illustrated in the FIG. 28, one end of the strap 504 is connected to a strap end connector 514 as by a loop 516. The loop 516 allows a flexible, rotatable connection between the attached end of the strap 504 and the strap end connector 514. The end connector 514 can be made of a semi-flexible yet resilient material such as leather. A cord loop connector 518 is mounted on the end connector 514 for purposes of retaining one end of a camera cord 524, the cord having an opposite end that is connected to, for example, the eyelet of a camera or camera base attachment (not shown).

Figure 26:
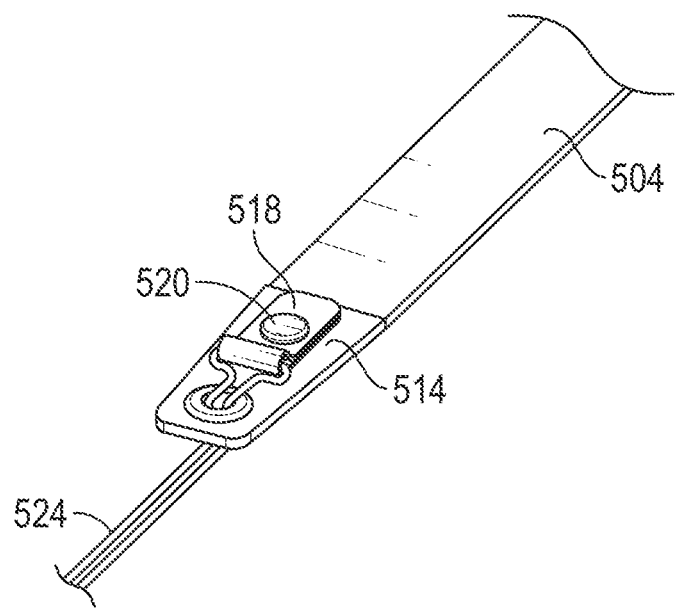
FIG. 26 is an enlarged perspective view of one end of the shoulder strap assembly of FIG. 24.
Figure 29:
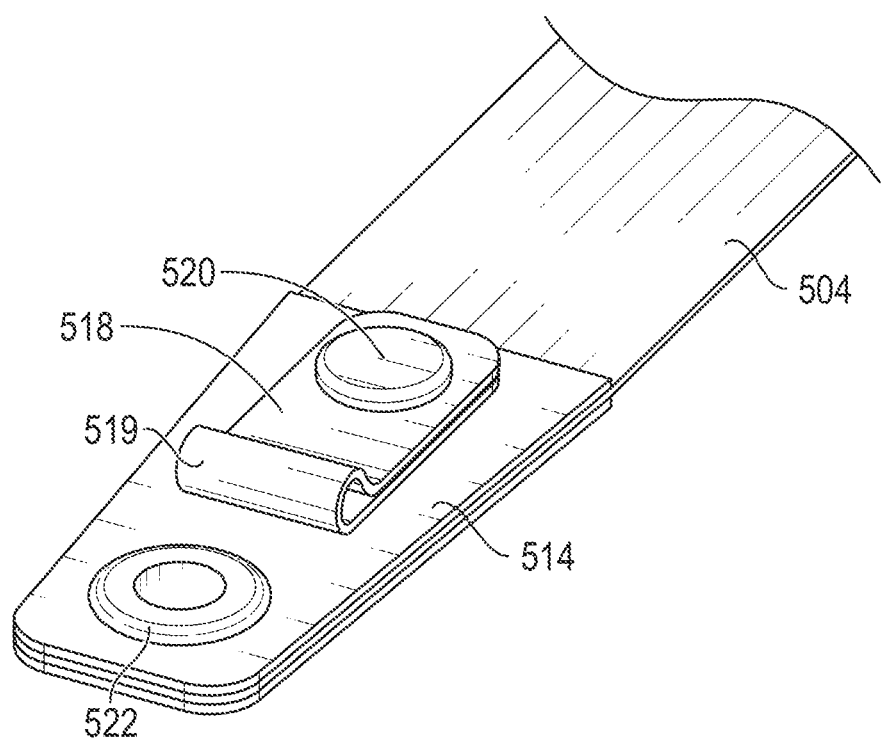
FIG. 29 is a greatly enlarged perspective view of the end portions of the shoulder strap assembly of FIG. 26 with the camera cord removed.

Referring to FIGS. 26 and 29, an opposite end of the main strap 504 is shown, and the opposite end also includes a strap end connector 514, a cord loop connector 518, and attached camera cord 524. The cord loop connectors 518 each include a folded section 519 that enables the cord 524 to pass therethrough. The free and of the cord loop connector is secured as by a releasable snap 520, such as a conventional snap connector used with clothing. A snap connector is particularly effective to prevent shear forces from opening the snap. As the cord 524 is oriented with a corresponding snap 520, the cord 524 will primarily produce a sheer force and therefore, a snap connector is a reliable yet simple choice for securing the cord to the shoulder strap assembly. Referring specifically to FIGS. 26 and 28 and 29, a looped end of the cord 524 is routed through the grommet 522 and secured in the channel of the folded section 519. In order to release the cord 524, the snap 520 is unfastened or unsnapped, and the looped end of the cord is removed from the loop connector 518. One particularly advantageous feature of the shoulder strap assembly utilizing the snap connector and grommet is that if the snap connector inadvertently becomes unfastened, the cord will not pass through the grommet without the user deliberately grasping the looped end of the cord and removing the unfastened end of loop connector. Otherwise, the unfastened end of the loop connector and cord cannot pass through the grommet based on the selected size of the opening in the grommet 522. Accordingly, the size of the opening is selected so that only the looped end of the cord passes through it, and not both the cord and the unfastened end of the loop connector.

The shoulder strap assembly could be of an integrally molded construction and made from any desired thermoplastic material. Alternatively, the shoulder strap assembly could be made of a fabric material in which the locking mechanism could then be mounted to the fabric body. It should be understood however that the shoulder strap assembly of the invention is not limited to any particular materials or combination of materials.

Changes may be made in the above methods and systems without departing from the scope hereof It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A shoulder strap system for carrying an object, comprising:
    a shoulder strap having first and second strap ends configured to connect to the object;
    a shoulder pad having one or more loops through which the shoulder strap is threaded; and
    a locking mechanism that, when engaged, increases friction between the shoulder strap and the shoulder pad to prevent sliding of the shoulder strap along the shoulder pad, and when disengaged, decreases the friction between the shoulder strap and the shoulder pad to facilitate sliding of the shoulder strap along the shoulder pad in response to movement of the object;
    each said first and second strap ends including a cord loop connector and a length of cord for connection to an attached object;
    said cord loop connector having a folded section forming an opening to receive a corresponding length of said cord therethrough, and said cord loop connector having a snap connector for selectively fastening and unfastening an end of said cord loop connector; and
    each said first and second strap ends further including a grommet to receive a corresponding length of said cord therethrough.

2. A camera carrying system, comprising:
    a base attachment configured to be affixed to a bottom face of a camera, the base attachment including a base plate and a base plate insert connected to the base plate;
    spatially-separated first and second bottom eyelets secured to the base attachment;
    a screw chamber formed on an exposed side of said base plate insert and configured to receive a camera locking screw therein;
    wherein a shoulder strap having first and second strap ends, when connected to the first and second bottom eyelets, creates first and second tether points that define a rotation axis lying substantially parallel to the bottom face of the camera, substantially parallel to a rear face of the camera, and beneath a center-of-mass of the camera; and
    a tripod adapter selectively engaged with said base attachment, said tripod adapter having a pin for releasably securing the tripod adapter to the base attachment.

3. The camera carrying system of claim 2, wherein:
    said tripod adapter includes at least one projection that mates with a corresponding recesses located on opposite sides of a central slot formed in said base plate.

4. The camera carrying system of claim 3, wherein: said base attachment and said tripod adapter further include aligned screw holes to receive said camera locking screw therein.

5. The camera carrying system of claim 2, wherein:
    said pin is spring loaded so that movement of the pin in one direction compresses a spring in communication with the pin to lock said tripod adapter to said base attachment, and movement of the pin in an opposite direction releases the spring to unlock said tripod enabling removal of the tripod adapter from said base attachment.

6. The camera carrying system of claim 2, wherein: said base attachment further includes a screw hole to receive said camera locking screw therein.

7. A base attachment especially adapted for use in a camera carrying system, comprising:
    a base attachment including a base plate and a base plate insert connected to the base plate;
    a central slot formed in said base plate;
    spatially-separated first and second bottom eyelets secured to the base attachment;
    a screw chamber formed on an exposed side of said base plate insert and configured to receive a camera locking screw therein;
    a tripod adapter selectively engaged with said central slot of said base plate, said tripod adapter including at least one projection that is placed in a corresponding recess of said central slot of said base plate; and
    wherein the base attachment is secured to a bottom face of a camera by said camera locking screw being engaged with a tripod socket formed into a bottom face of the camera.

8. A base attachment especially adapted for use in a camera carrying system, comprising:
    a base attachment including a base plate and a base plate insert connected to the base plate;
    a central slot formed in said base plate;

spatially-separated first and second bottom eyelets secured to the base attachment;

a screw chamber formed on an exposed side of said base plate insert and configured to receive a camera locking screw therein;

a tripod adapter selectively engaged with said central slot of said base plate;

wherein the base attachment is secured to a bottom face of a camera by said camera locking screw being engaged with a tripod socket formed into a bottom face of the camera; and an actuator pin mounted in said base attachment and being selectively operable to lock and unlock engagement of said tripod adapter with said base attachment.

9. A shoulder strap assembly comprising:

a main strap having first and second ends;

a shoulder pad secured to said main strap by a plurality of strap keepers integral with said shoulder pad;

a cam buckle for selectively releasing or locking said main strap, said cam buckle having a buckle base and a rotatable latch secured to said buckle base, wherein one end of said main strap is routed through said cam buckle;

at least one of said first and second ends having a grommet secured thereto and an opening extending through said grommet;

a cord loop connector mounted to said main strap adjacent said grommet, said cord loop connector having a folded section and said cord loop connector being movable being snapped and unsnapped;

a cord having a looped end routed through said folded section and through said opening of said grommet; and wherein said opening of said grommet has a selected size so that said looped end of said cord can pass through but not both said looped end of said cord and an unfastened end of said loop connector.

10. The shoulder strap assembly of claim 9, further including:

a slide adjuster secured to said main strap to adjust a length of said main strap.

* * * * *